United States Patent
Imai et al.

(10) Patent No.: US 9,041,646 B2
(45) Date of Patent: May 26, 2015

(54) INFORMATION PROCESSING SYSTEM, INFORMATION PROCESSING SYSTEM CONTROL METHOD, INFORMATION PROCESSING APPARATUS, AND STORAGE MEDIUM

(71) Applicant: Canon Kabushiki Kaisha, Tokyo (JP)

(72) Inventors: Hitoshi Imai, Kawasaki (JP); Taku Ogasawara, Kawasaki (JP); Yuji Naya, Kawasaki (JP); Keisui Okuma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 13/791,564

(22) Filed: Mar. 8, 2013

(65) Prior Publication Data

US 2013/0234932 A1 Sep. 12, 2013

(30) Foreign Application Priority Data

Mar. 12, 2012 (JP) ................. 2012-055002

(51) Int. Cl.
*G06F 3/00* (2006.01)
*G06F 3/01* (2006.01)
*G06Q 10/00* (2012.01)

(52) U.S. Cl.
CPC ............ *G06F 3/005* (2013.01); *G06F 3/011* (2013.01); *G06Q 10/00* (2013.01)

(58) Field of Classification Search
CPC ......... G06F 3/005; G06F 3/011; G06F 3/012; G06F 3/016; G06F 3/038; G06F 17/30244; G06F 17/30247; G06F 17/30256; G06F 17/30259; G06K 9/00211; G06T 2207/30201; G06Q 10/00; G06G 3/36; G02B 27/01; G02B 27/017; G02B 2027/017; H04N 13/0468; H04N 13/0484
USPC ........... 345/4, 7, 8, 9, 156; 382/103, 140, 291
See application file for complete search history.

(56) References Cited

U.S. PATENT DOCUMENTS

| | | | |
|---|---|---|---|
| 7,324,081 B2 * | 1/2008 | Friedrich et al. | 345/156 |
| 8,467,571 B2 * | 6/2013 | Momoi et al. | 382/103 |
| 2004/0104935 A1 * | 6/2004 | Williamson et al. | 345/757 |
| 2006/0061551 A1 * | 3/2006 | Fateh | 345/158 |
| 2007/0268392 A1 * | 11/2007 | Paalasmaa et al. | 348/333.02 |
| 2008/0051033 A1 * | 2/2008 | Hymes | 455/47 |
| 2008/0268876 A1 * | 10/2008 | Gelfand et al. | 455/457 |
| 2010/0077003 A1 * | 3/2010 | Kondo et al. | 707/780 |
| 2010/0142762 A1 * | 6/2010 | Morita | 382/115 |
| 2010/0271395 A1 * | 10/2010 | Isogai et al. | 345/635 |
| 2011/0064311 A1 * | 3/2011 | Momosaki | 382/190 |
| 2013/0088337 A1 * | 4/2013 | Blanchflower et al. | 340/384.1 |
| 2013/0114849 A1 * | 5/2013 | Pengelly et al. | 382/103 |
| 2013/0176202 A1 * | 7/2013 | Gervautz | 345/156 |

FOREIGN PATENT DOCUMENTS

JP 2009-301407 A 12/2009

* cited by examiner

*Primary Examiner* — Tom Sheng
(74) *Attorney, Agent, or Firm* — Canon USA, Inc., I.P. Division

(57) ABSTRACT

An information processing system determines a relationship between an observer and an observation target person based on personal information of the observer and personal information of the observation target person, and displays content information generated based on the determined relationship together with an image of the observation target person in a display area of a display unit.

3 Claims, 22 Drawing Sheets

| node.id | node.name | node.edge | node.todo | node.sns | node.schedule | node.face_image | node.trace_info |
|---|---|---|---|---|---|---|---|
| 0001 | A | [node.id=2.0], [node.id=3.1], [node.id=4.1] | title = "△△ PURCHASE PROCEDURE" text = "COMPLETION BY 16TH DAY IS REQUIRED." | title = "CHINESE-STYLE NOODLES" text = "□□ NOODLE RESTAURANT ACROSS FROM ○○ STATION IS RECOMMENDABLE. DON'T YIELD TO TSUKEMEN!" | meeting = [title = "DB RENEWAL MEETING", day=2012/3/15, start_time="10:00", end_time="11:00"] | node1.bmp | skeletonID=0, coord=[1,1,0], direction=[90] |
| 0002 | B | [node.id=1.0], [node.id=3.1], [node.id=4.1] | none | title = "TODAY'S TAMA" text = "TAMA STAYS CALM WITH ROUNDED BODY IN TABLE TYPE FOOT-WARMER." | meeting = [title = "NEW PRODUCT DESIGN REVIEW", day=2012/3/15, start_time="15:00", end_time="17:00"] | node2.bmp | skeletonID=5, coord=[1,-1,0], direction=[270] |
| 0003 | C | [node.id=1.1], [node.id=2.1], [node.id=4.0] | title = "CONFIRMATION ABOUT PROGRESS IN CONTRACT WITH XX CORPORATION" text = "COMPLETION BY 20TH DAY IS REQUIRED. REQUEST PERSON A IN CONTRACT SECTION TO CONFIRM IT." | none | meeting = [title = "NEW PRODUCT DESIGN REVIEW", day=2012/3/15, start_time="15:00", end_time="17:00"] | node3.bmp | skeletonID=2, coord=[0,0,0], direction=[60] |
| 0004 | D | [node.id=1.1], [node.id=2.1], [node.id=3.0] | none | title = "SKI TOUR" text = "TODAY I ENJOYED SKIING IN SHIGAKOGEN HIGHLANDS. POWDER SNOW IN SKI SLOPE TERAKOYA WAS GREAT!" | meeting=[title="○△ REGULAR", day=2012/3/15, start_time="9:00", end_taime="10:00"], [title="○□ REGULAR", day=2012/3/15, start_time="11:00", end_time="12:00"] | node4.bmp | skeletonID=3, coord=[2,0,0], direction=[120] |

FIG.4

| node.id | node.name | node.edge | node.todo | node.sns | node.schedule | node.face_image | node.trace_info |
|---|---|---|---|---|---|---|---|
| 0001 | A | [node.id=2,0], [node.id=3,1], [node.id=4,1] | title = "△△ PURCHASE PROCEDURE" text = "COMPLETION BY 16TH DAY IS REQUIRED." | title = "CHINESE-STYLE NOODLES" text = "□□ NOODLE RESTAURANT ACROSS FROM ○○ STATION IS RECOMMENDABLE. DON'T YIELD TO TSUKEMEN!" | meeting = [title = "DB RENEWAL MEETING", day=2012/3/15, start_time="10:00", end_time="11:00"] | node1.bmp | skeletonID=0, coord=[1,1,0], direction=[90] |
| 0002 | B | [node.id=1,0], [node.id=3,1], [node.id=4,1] | none | title = "TODAY'S TAMA" text = "TAMA STAYS CALM WITH ROUNDED BODY IN TABLE TYPE FOOT-WARMER." | meeting = [title = "NEW PRODUCT DESIGN REVIEW", day=2012/3/15, start_time="15:00", end_time="17:00"] | node2.bmp | skeletonID=5, coord=[1,-1,0], direction=[270] |
| 0003 | C | [node.id=1,1], [node.id=2,1], [node.id=4,0] | title = "CONFIRMATION ABOUT PROGRESS IN CONTRACT WITH XX CORPORATION" text = "COMPLETION BY 20TH DAY IS REQUIRED. REQUEST PERSON A IN CONTRACT SECTION TO CONFIRM IT." | none | meeting = [title = "NEW PRODUCT DESIGN REVIEW", day=2012/3/15, start_time="15:00", end_time="17:00"] | node3.bmp | skeletonID=2, coord=[0,0,0], direction=[60] |
| 0004 | D | [node.id=1,1], [node.id=2,1], [node.id=3,0] | none | title = "SKI TOUR" text = "TODAY I ENJOYED SKIING IN SHIGAKOGEN HIGHLANDS. POWDER SNOW IN SKI SLOPE TERAKOYA WAS GREAT!" | meeting=[title="○△ REGULAR", day=2012/3/15, start_time="9:00", end_taime="10:00"], [title="○□ REGULAR", day=2012/3/15, start_time="11:00", end_time="12:00"] | node4.bmp | skeletonID=3, coord=[2,0,0], direction=[120] |

FIG.5

```
100:  if( observer.edge.target == true )
110:  {
120:     //ACQUAINTANCE
130:
140:     //SEARCH OBSERVER'S ToDo TO FIND OUT OBSERVATION TARGET PERSON NAME.
150:     if( result 1 = observer.todo.search( target.name ))
160:     {
170:        display("PERSON CONCERNED WITH YOUR ToDo ¥s.",
180:            result1.title )
190:     }
200:     //TODAY, IS THERE ANY MEETING TO BE ATTENDED BY BOTH OBSERVER AND OBSERVATION TARGET PERSON?
210:     else if( result1 = observer.schedule.today.meeting.search( target.schedule.today.meeting ) )
220:     {
230:        display("TODAY, MEETING WITH PERSON ¥s IS SCHEDULED FROM ¥s FOR ISSUE ¥s.",
240:            result1.start_time,
250:            target.name,
260:            result1.title )
270:     }
280:     //TODAY, IS THERE ANY BLANK HOURS COMMON TO OBSERVER AND OBSERVATION TARGET PERSON?
290:     else if( result1 = observer.schedule.today.blank.search( target.schedule.today.blank ) )
300:     {
310:        //SEARCH FOR TIME ZONE INCLUDING CURRENT TIME IN COMMON BLANK HOURS.
320:        if( result2 = result1.term.search( now ) )
330:        {
340:           //IS NEXT TIME ZONE PRESENT IN COMMON BLANK HOURS?
350:           if( result2.next() == NULL )
360:           {
370:              display("TODAY, YOU HAVE A CHANCE TO TALK DIRECTLY TO PERSON ¥s FROM NOW TO ¥s.",
380:                 result2.end_time )
390:           }
400:        }
410:     }
420:     //PERSON WHO HAS PUT A FAVORITE MARK ON YOUR SNS ARTICLE?
430:     else if( result1 = observer.SNS.article.search( target.SNS.favorite_article ) )
440:     {
450:        display("CAPTURED TARGET IS PERSON WHO HAS PUT FAVORITE MARK ON ¥s ARTICLE OF YOUR SNS.",
460:            result1.title )
470:     }
480:  }
490:  else
500:  {
510:     //FIRST MEETING
520:     display("PERSON ¥s",
530:         target.name )
540:  }
```

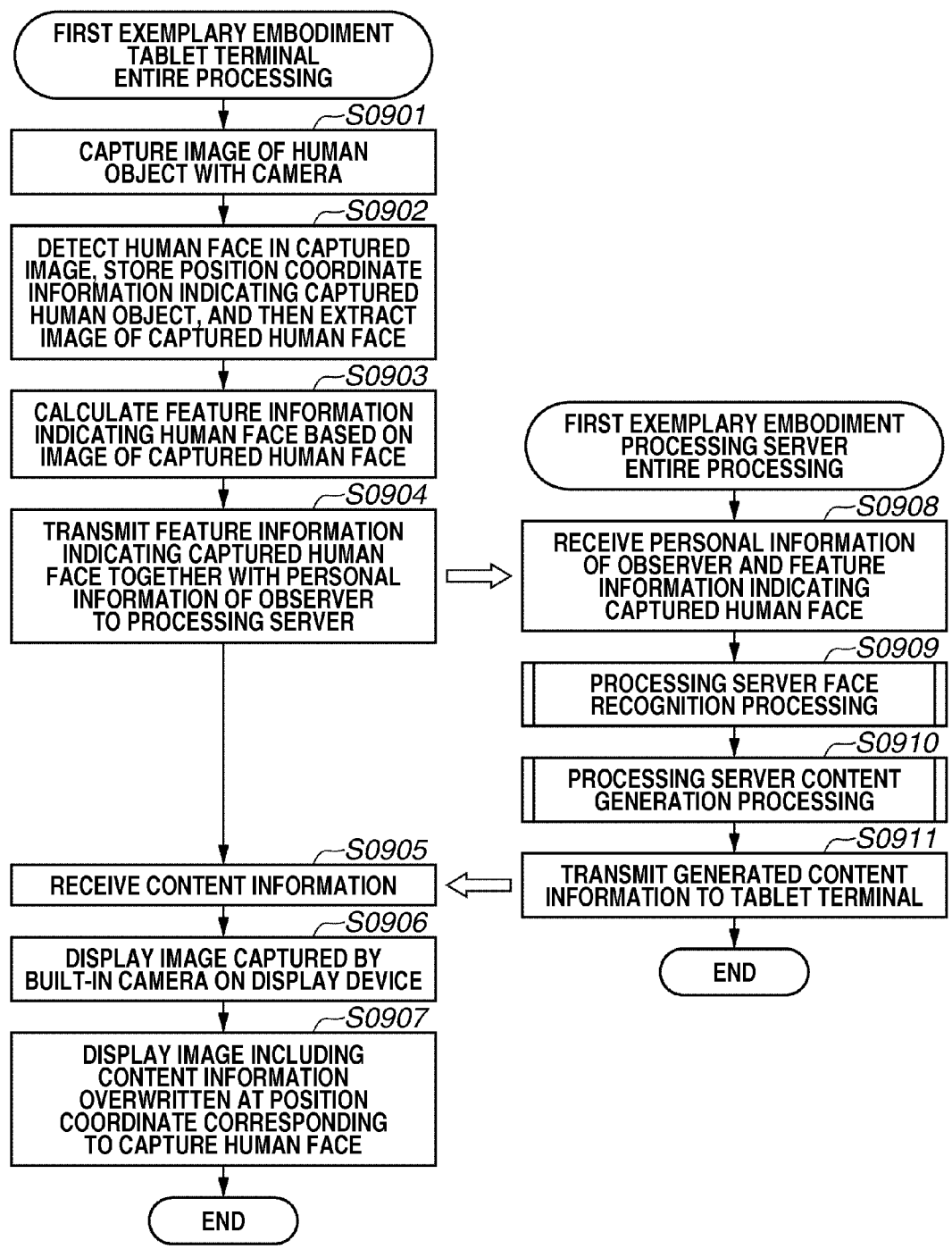

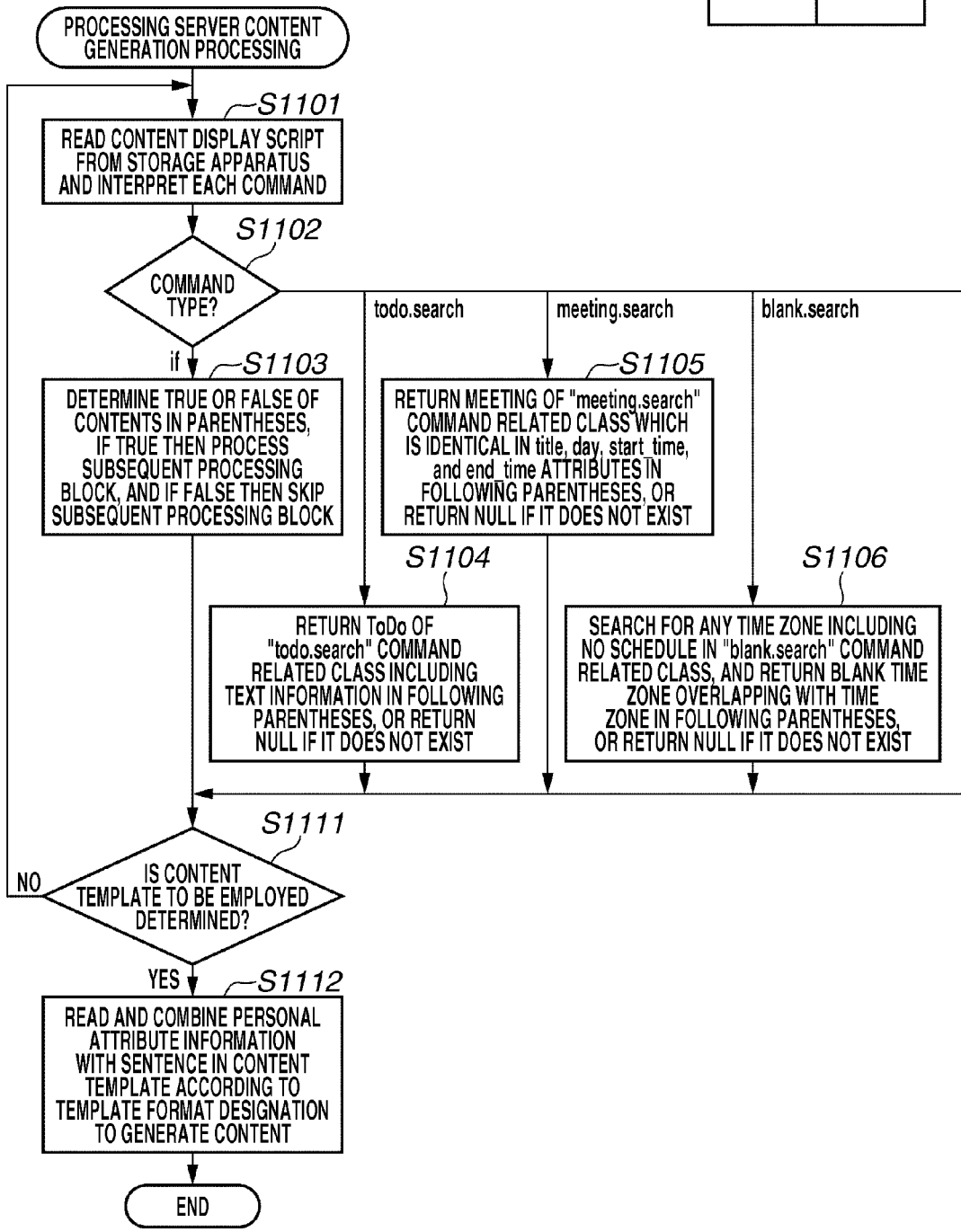

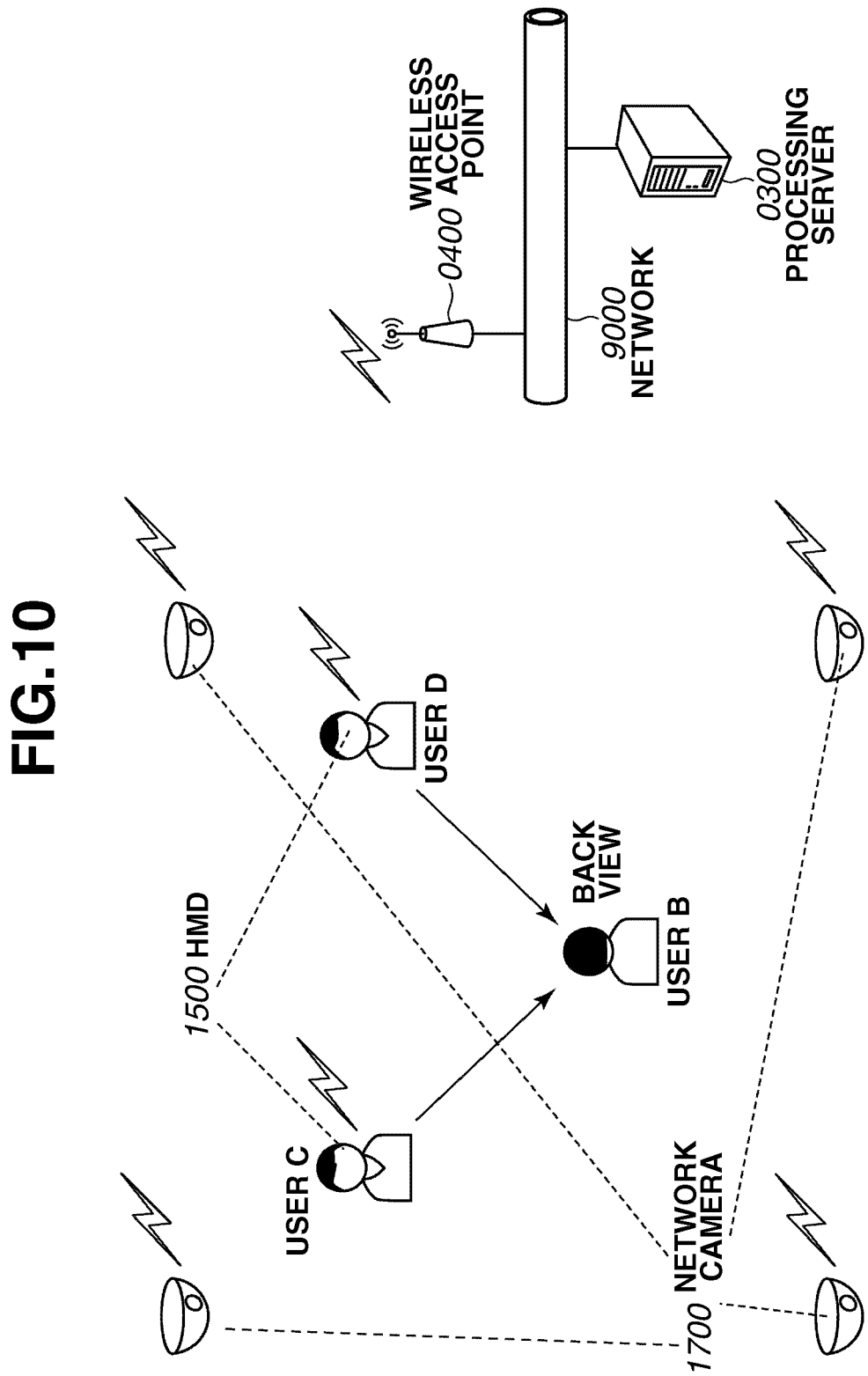

SCREEN DISPLAYED ON DISPLAY
DEVICE OF HMD OF USER C

SCREEN DISPLAYED ON DISPLAY
DEVICE OF HMD OF USER D

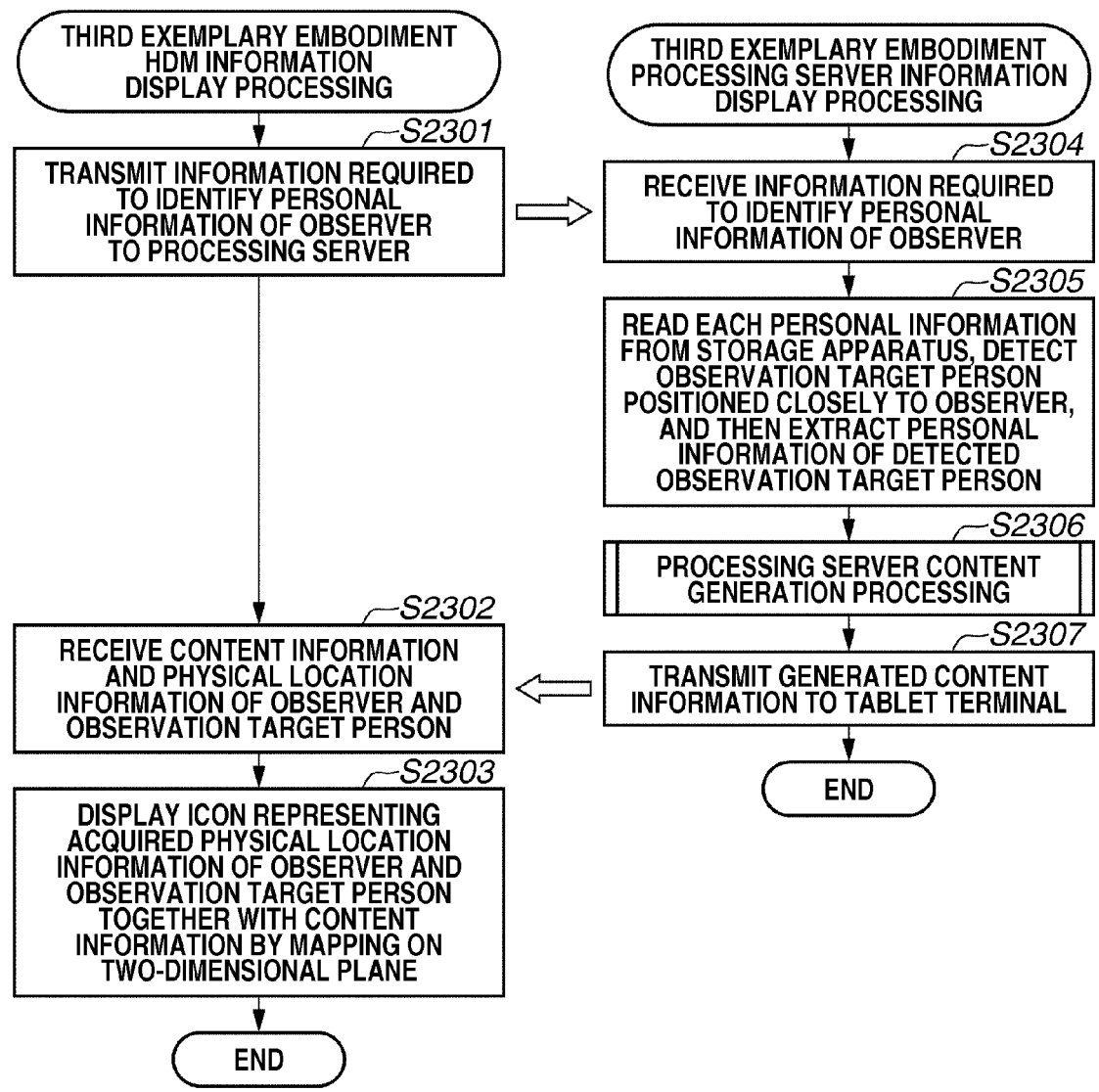

SCREEN DISPLAYED ON DISPLAY DEVICE OF HMD OF USER C

//INFORMATION PROCESSING SYSTEM, INFORMATION PROCESSING SYSTEM CONTROL METHOD, INFORMATION PROCESSING APPARATUS, AND STORAGE MEDIUM

BACKGROUND OF THE INVENTION

1. Field of the Invention

The present invention relates to an information processing technique capable of promoting communications performed between persons.

2. Description of the Related Art

There is a conventional information processing system that can promote communications between persons. An information processing system discussed in Japanese Patent Application Laid-Open No. 2009-301407 can obtain position information of each human object and calculate an information distance, which represents a degree of relevancy between human objects that are positioned closely, with respect to the physical distance between human objects. Then, if the calculated information distance is short (more specifically, when the degree of relevancy is large), the system displays the presence of a neighboring human object having a larger degree of relevancy on a display device. Thus, the system enables a user to actively contact the human object having a larger degree of relevancy and can promote communications between persons.

However, the technique discussed in Japanese Patent Application Laid-Open No. 2009-301407 can display the presence of a neighboring human object having a larger degree of relevancy, but is not effective to enable a user to confirm a relationship between the user and a target human object. Further, in a case where a plurality of human objects is positioned closely, it is difficult to determine a human object that has a larger degree of relevancy.

SUMMARY OF THE INVENTION

The present invention is directed to an information processing system that can display content information indicating a relationship between a user and a human object positioned closely in association with an actual image of the human object positioned closely.

According to an aspect of the present invention, an information processing system includes a display unit configured to display an image of an observation target person observed by an observer in a display area, a storage unit configured to store personal information of the observer and personal information of the observation target person, a determination unit configured to determine a relationship between the observer and the observation target person based on the personal information of the observer and the personal information of the observation target person stored in the storage unit, and a generation unit configured to generate content information to be displayed in the display area based on the relationship determined by the determination unit, wherein the generated content information is displayed together with the image of the observation target person in the display area.

The information processing system according to the present invention can display content information based on a relationship between a user and an observation target person together with an image of the observation target person. Therefore, the display enables the user to easily understand the relationship between the user and the observation target person.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates a personal information database stored in a storage apparatus by the processing server according to the first exemplary embodiment.

FIG. 5 illustrates an example of a content display script according to the first exemplary embodiment.

FIG. 6 is a flowchart illustrating entire processing performed by the information processing system according to the first exemplary embodiment.

FIG. 10 illustrates a configuration of an information processing system according to second and third exemplary embodiments.

FIG. 18 is a flowchart illustrating information display processing according to the third exemplary embodiment.

DESCRIPTION OF THE EMBODIMENTS

Various exemplary embodiments, features, and aspects of the invention will be described in detail below with reference to the drawings.

System Configuration According to First Exemplary Embodiment

Figure 1:
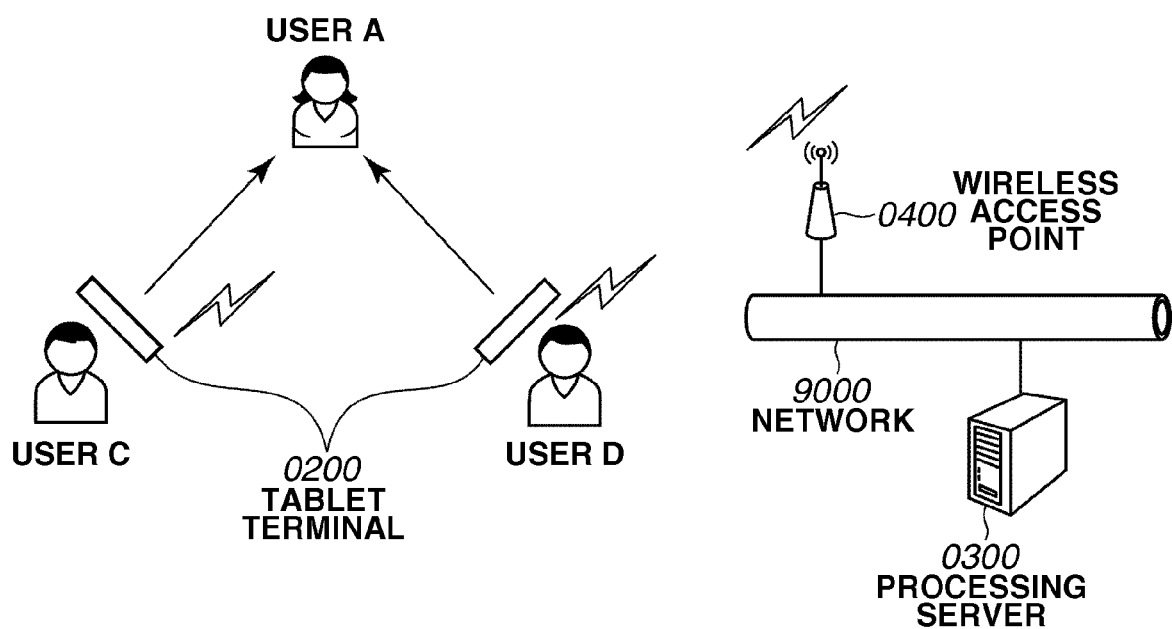
FIG. 1 illustrates a configuration of an information processing system according to a first exemplary embodiment of the present invention.

FIG. 1 illustrates a configuration of an information processing system according to a first exemplary embodiment of the present invention. The information processing system according to the present exemplary embodiment includes a tablet terminal 0200 owned by a user C, another tablet terminal 0200 owned by a user D, a wireless access point 0400, a processing server 0300, and a network 9000. Each tablet terminal 0200 can perform wireless communication with the wireless access point 0400. Each tablet terminal 0200 is connected to the wired network 9000 via the wireless access point 0400. The processing server 0300 and the wireless access point 0400 are connected to each other via the wired network 9000. The user C and the user D are positioned toward a user A. Therefore, each of the user C and the user D can capture a face image of the user A with a camera 0203 equipped in the tablet terminal 0200.

<Tablet Terminal>

Figure 2:
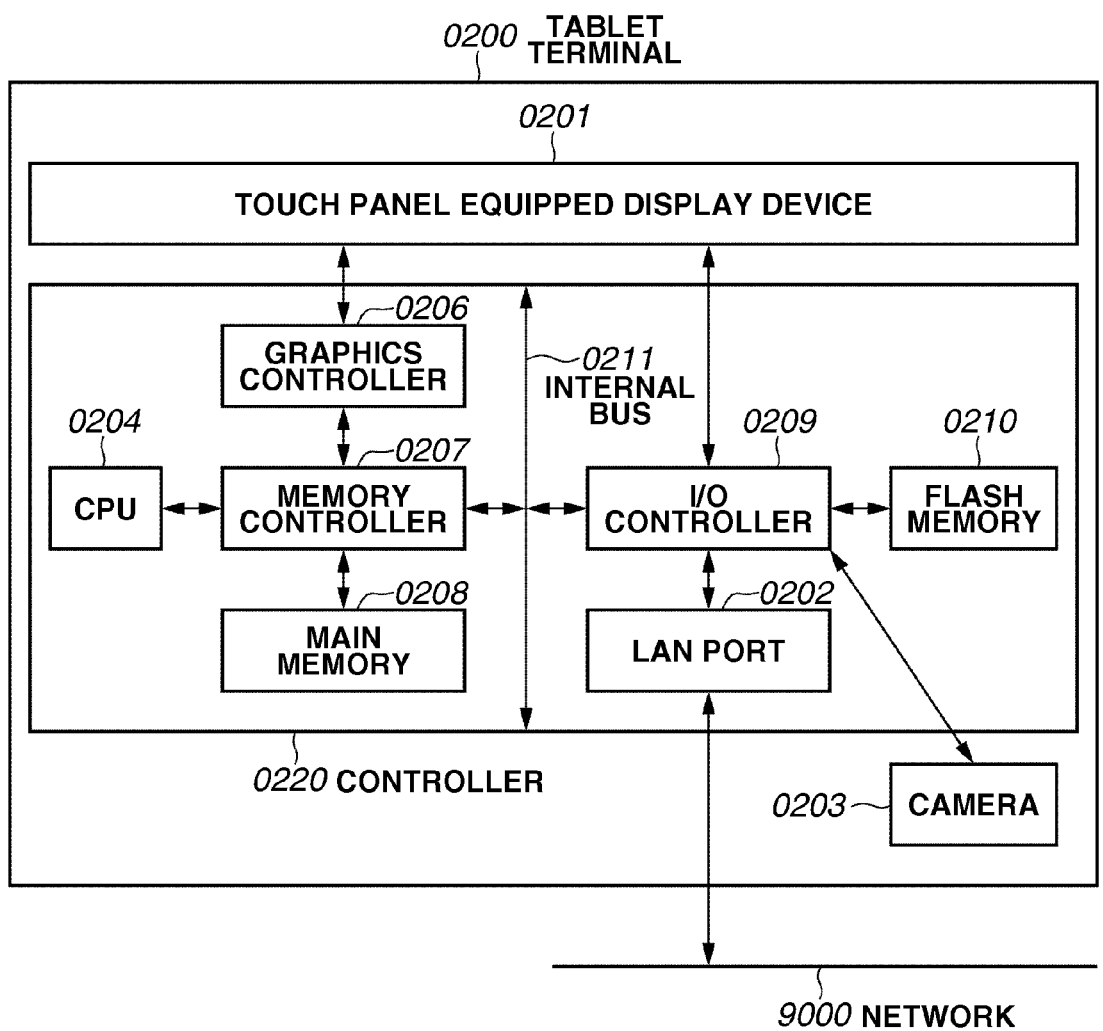
FIG. 2 is a block diagram illustrating a hardware configuration of a tablet terminal according to the first exemplary embodiment.

FIG. 2 is a block diagram illustrating a hardware configuration of the tablet terminal 0200 according to the present exemplary embodiment. The tablet terminal 0200 includes a controller 0220, a touch panel equipped display device 0201, a local area network (LAN) port 0202, and the camera 0203.

The controller 0220 has a hardware configuration described in detail below.

An internal bus 0211 transmits and receives electric signals to enable a memory controller 0207 to transmit and receive information to and from an input/output (I/O) controller 0209. The memory controller 0207 comprehensively controls memory accesses to a main memory 0208. The I/O controller 0209 transmits and receives information to and from a flash memory 0210, the LAN port 0202, the touch panel equipped display device 0201 (hereinafter, referred to as "display device 0201"), the camera 0203, and any other processing unit connected via the internal bus 0211.

The LAN port 0202 performs wireless communications with the wireless access point 0400 to relay information transmission and reception performed between the I/O controller 0209 and the processing server 0300 or other devices connected via the network 9000.

The flash memory 0210 stores a boot loader program and a tablet terminal control program. The main memory 0208 is a volatile memory which has high-speed access capability and stores information stored in the flash memory 0210 and information to be used temporarily such as images captured by the camera 0203.

When the power to the tablet terminal 0200 is turned on, a central processing unit (CPU) 0204 reads and executes the boot loader program and extracts the tablet terminal control program stored in the flash memory 0210. Further, the CPU 0204 stores the extracted tablet terminal control program in the main memory 0208. Then, the CPU 0204 executes the tablet terminal control program loaded from the main memory 0208 to realize each function of the tablet terminal and executes processing in steps S0901 to S0907 in illustrated in FIG. 6.

The foregoing is the description relating to the configuration of the controller 0220.

The tablet terminal 0200 is equipped with the display device 0201 which includes an information display device integrated with a touch panel that enables a user to input information. A graphics controller 0206 controls the display of information in a display area of the display device 0201. The tablet terminal 0200 is configured to display information in the display area of the display device 0201 to present information to a user. Each user can perform a touch operation on the display device 0201 to input information to the tablet terminal 0200.

In addition, the tablet terminal 0200 includes the camera (i.e., an imaging unit) 0203. The camera 0203 converts a captured image into digital image data. The camera 0203 transmits and receives information to and from the I/O controller 0209.

<Processing Server>

Figure 3:
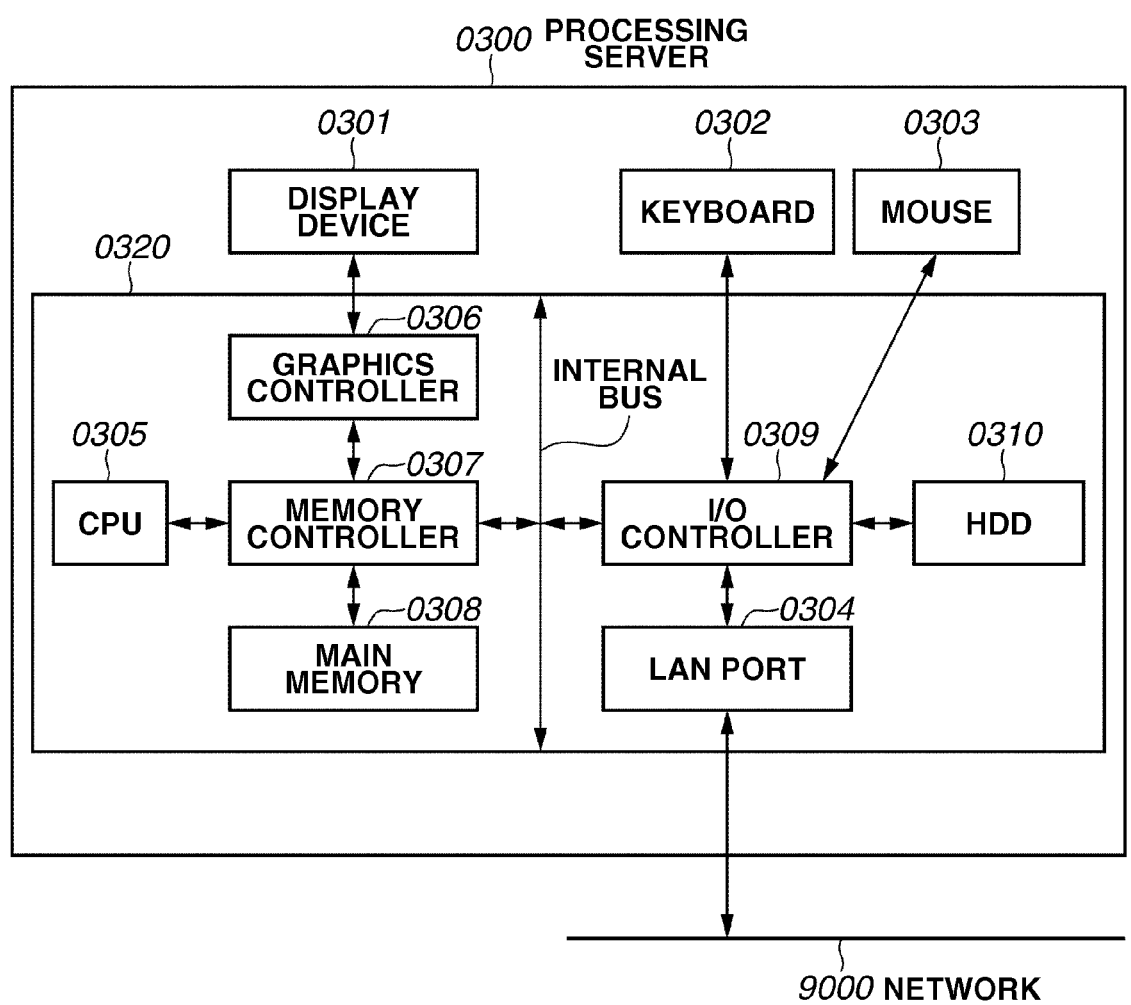
FIG. 3 is a block diagram illustrating a hardware configuration of a processing server according to the first exemplary embodiment.

FIG. 3 is a block diagram illustrating a hardware configuration of the processing server 0300 according to the present exemplary embodiment. The processing server 0300 includes a controller 0320, a display device 0301, a keyboard 0302, and a mouse 0303.

The controller 0320 has a hardware configuration described in detail below.

An internal bus 0311 transmits and receives electric signals to enable a memory controller 0307 to transmit and receive information to and from an I/O controller 0309.

The memory controller 0307 comprehensively controls memory accesses to a main memory 0308. The I/O controller 0309 transmits and receives information to and from a hard disk drive (HDD) 0310, a LAN port 0304, the keyboard 0302, the mouse 0303, and any processing unit connected via the internal bus 0311. The LAN port 0304 transmits and receives information to and from the I/O controller 0309 or other device connected via the network 9000 or the wireless access point 0400.

The HDD 0310 stores a boot loader program and a processing server control program. The main memory 0308 is a volatile memory which has high-speed access capability and stores information stored in the HDD 0310 and temporarily used information.

When the power to the processing server 0300 is turned on, the CPU 0305 reads and executes the boot loader program and extracts the processing server control program from the HDD 0310. Further, the CPU 0305 stores the extracted processing server control program in the main memory 0308. Then, the CPU 0305 executes the processing server control program loaded from the main memory 0308 to realize each function of the processing server 0300. Further, the CPU 0305 executes the processing server control program to realize processing to be performed by the processing server illustrated in FIGS. 6, 11, 18, 19, 23, and 26.

The foregoing is the description relating to the configuration of the controller 0320.

The processing server 0300 includes the display device 0301 that can display information. A graphics controller 0306 controls the display of information on the display device 0301.

The processing server 0300 is configured to display information on the display device 0301 to present information to a user. Each user can operate the keyboard 0302 and/or the mouse 0303 to input information to the processing server 0300.

<Personal Information Database>

FIG. 4 illustrates a data table 0700 to be managed as a personal information database stored in the HDD 0310 of the processing server 0300 according to the present exemplary embodiment. In the data table illustrated in FIG. 4, each row is managed as one record which includes management information belonging to any one of the following eight attributes. The data of one record is managed as personal information of one user.

a-1) node.id: the "node.id" column is usable to manage personal information of each user with a unique ID. The user ID is identification information uniquely allocated to each user to discriminate the user from other users. Each user registers the unique ID beforehand in the tablet terminal 0200. For example, an employee number of the user can be set beforehand as the user ID in the tablet terminal 0200. The set user ID can be stored in the main memory 0208 of the controller 0220 and can be read out if it is necessary.

a-2) node.name: the "node.name" column is usable to manage the name of each user. For example, in the data table in FIG. 4, the node.id is 0001 and the node.name is "A", and it means that the personal information to be managed with "node.id=0001" belongs to the user A.

a-3) node.edge: the "node.edge" column is usable to manage an acquaintance relationship between users. For example, {node.id=2, 0} is set as node.edge information in the record of the user A whose personal information is managed with "node.id=0001". Therefore, it indicates that the user A has no personal acquaintance with a user B whose personal information is managed with "node.id=0002". Further, {node.id=3, 1} and {node.id=4, 1} are set as node.edge information in the record of the user A whose personal information is managed with "node.id=0001". Therefore, it indicates that the user A has personal acquaintance with the user C and the user D whose personal information is managed with "node.id=0003" and "node.id=0004", respectively. In other words, if Z is set to 1 in {node.id=Y, Z} to be set as node.edge information in the record of a user X, it indicates that the user X has personal acquaintance with a user whose personal information is managed with "node.id=Y". On the other hand, if Z is set to 0 in {node.id=Y, Z} to be set as node.edge information, it indicates that the user X has no personal acquaintance with a user whose personal information is managed with "node.id=Y".

a-4) node.todo: the "node.todo" column is usable to manage a content of a ToDo list that is managed by each user. If each user edits a ToDo list managed by a scheduler application that operates on an information processing terminal (not illustrated) connected to the processing server 0300, the edited content is reflected and stored in the "node.todo" column. For example, in FIG. 4, the title of a ToDo list of "node.id=0003" (i.e., the user C) is "Confirmation about progress in contract with XX corporation" and its detailed content is "Completion by 20th day is required. Request user A in contract section to confirm it".

a-5) node.sns: the "node.sns" column is usable to manage a content that each user has contributed to a social network service (SNS). If each user contributes a comment to an SNS (e.g., in-house SNS) via an information processing terminal (not illustrated) connected to the processing server 0300, the contributed comment is reflected and stored in the "node.sns" column.

a-6) node.schedule: the "node.schedule" column is usable to manage a content of a schedule managed by each user. If each user edits a schedule list managed by a scheduler application that operates on an information processing terminal connected to the processing server 0300, the edited result is reflected and stored in the "node.schedule" column. For example, in FIG. 4, "node.id=0002" (i.e., the user B) and "node.id=0003" (i.e., the user C) are both scheduled to attend the meeting titled "new product design review" to be held at the time "15:00 to 17:00 on 2012/3/15".

a-7) node.face_image: the "node.face_image" column is usable to manage a face image of each user. For example, a photograph of an employee captured for an employee ID card may be registered as a face image of the user.

a-8) node.trace_info: the "node.trace_info" column is usable to manage physical position information that indicates a position of each user in a physical space in a building or the like (e.g., an office). For example, in the data table illustrated in FIG. 4, the ID to be allocated as physical position information of "node.id=0001" (i.e., the user A) when a human body is captured by a network camera is expressed with an attribute "skeleton ID" and a numerical value "0". Further, position coordinates of the user A in a physical space managed by the system are expressed with an attribute "coord", according to which the user A is positioned at the x coordinate=1 m, the y coordinate=1 m, and the z coordinate (i.e., height)=0 m. Further, a direction that the user A is looking managed by the system is expressed with an attribute "direction", according to which the user A faces the direction of 90 degrees in the coordinate system that defines the physical space.

<Content Display Script>

FIG. 5 illustrates an example of the content display script according to the present exemplary embodiment. Each user can express any processing that the user wants by combining a plurality of commands defined in advance by the language specification of the script. In FIG. 5, the numerical number written on the left side represents the row number, and a group of character strings written on the right side represents the content of the script expressed using the commands. The processing server 0300 interprets and executes the script illustrated in FIG. 5 according to the procedure of a flowchart illustrated in FIG. 8.

Processing Flow According to First Exemplary Embodiment

An entire processing flow according to the first exemplary embodiment is described in detail below with reference to FIG. 6. The controller 0220 of the tablet terminal 0200 performs processing in steps S0901 to S0907 illustrated in FIG. 6. The controller 0320 of the processing server 0300 performs processing in steps S0908 to S0911 illustrated in FIG. 6.

In step S0901, in response to an operation by a user, the controller 0220 controls the camera 0203 to capture an image of a human object. Then, the operation proceeds to step S0902.

In step S0902, the controller 0220 detects a face of the human object from the captured image and calculates position coordinate information of the detected face of the human object in the captured image. The controller 0220 stores the calculated position coordinate information in the main memory 0208 of the controller 0220. Then, the controller 0220 extracts an image of the detected face of the human object from the captured image. Then, the operation proceeds to step S0903.

In step S0903, the controller 0220 calculates face feature information required to identify the human object from the face image of the human object included in the above-described captured image. Then, the operation proceeds to step S0904. According to the present exemplary embodiment, as a method for detecting a face of a human object in a captured image and calculating face feature information, a method for converting a face image into a feature space vector is used. However, any other conventional method is usable to calculate the face feature information.

In step S0904, the controller 0220 transmits the above-described face feature information of the human object included in the captured image, together with information required to identify personal information of an observer (i.e., a user who takes a photograph of a human object with the camera 0203 of the tablet terminal 0200), to the processing server 0300. The information required to identify the personal information of the observer is information required to uniquely identify personal information of a user who serves as the observer in the data table 0700 that manages a plurality of pieces of personal information. According to the present exemplary embodiment, for example, the information required to identify the personal information of the observer is the "node.id" value illustrated in FIG. 4 (i.e., the table that manages the personal information of the user who serves as the observer), which is information having been set beforehand in the tablet terminal 0200.

In this case, in step S0908, the controller 0320 of the processing server 0300 receives, from the tablet terminal 0200, the information required to identify the personal information of the observer and the face feature information of the human object included in the captured image. Then, the operation proceeds to step S0909. In this case, the face feature information of the human object included in the captured image is information required to identify personal information of the human object in the captured image which is used in face recognition processing to be performed in step S0909.

Figure 7:
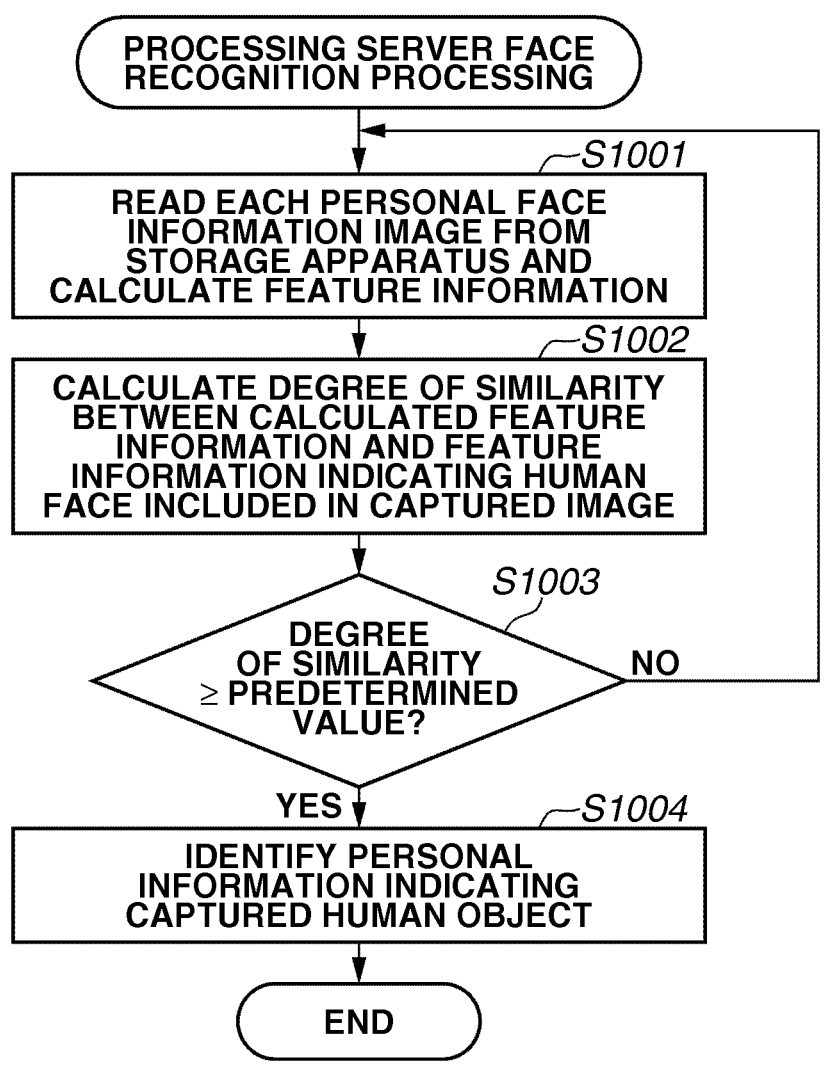
FIG. 7 is a flowchart illustrating face recognition processing performed by the processing server according to the first exemplary embodiment.

In step S0909, the controller 0320 performs the face recognition processing illustrated in FIG. 7. Then, the operation proceeds to step S0910.

In step S0910, the controller 0320 performs content generation processing illustrated in FIG. 8. Then, the operation proceeds to step S0911.

In step S0911, the controller 0320 transmits the content information generated in step S0910 to the tablet terminal 0200, and terminates the processing of the processing server 0300.

In this case, in step S0905, the controller 0220 of the tablet terminal 0200 receives the content information from the processing server 0300. Then, the operation proceeds to step S0906.

In step S0906, the controller 0220 displays the image captured by the camera 0203 on the display device 0201. Then, the operation proceeds to step S0907.

In step S0907, the controller 0220 calculates position coordinates of a point that is adjacent to the face image of the human object included in the captured image. Then, the controller 0220 displays the content information by superimposing on the captured image at the calculated position coordinates in the display area. More specifically, the controller 0220 functions as a unit configured to display content information in association with an observation target person by displaying the content information together with an image of the observation target person on the display device 0201. The position adjacent to the face of the human object is, for example, a position offset a predetermined distance from the face position stored in the main memory 0208 in step S0902. Thus, the content information can be displayed in association with the human object (observation target person) in the captured image.

<Face Recognition Processing>

FIG. 7 is a flowchart illustrating a procedure of the face recognition processing executed by the processing server 0300 according to the present exemplary embodiment.

In step S1001, the controller 0320 of the processing server 0300 reads a user's face information image (i.e., information of the node.face image illustrated in FIG. 4) for each node.id from the data table 0700 in the storage apparatus (e.g., the HDD 0310), and calculates face feature information based on the face information image. Then, the operation proceeds to step S1002.

In step S1002, the controller 0320 calculates a degree of similarity between the feature information calculated in step S1001 and the feature information of the face image of the human object included in the captured image. Then, the operation proceeds to step S1003. According to the present exemplary embodiment, as a method for calculating the degree of similarity in the human face feature information, for example, a method for obtaining correlation with an angle between two feature space vectors is used. However, the similarity calculation method is not limited to the above-described example and any other conventionally known method is employable.

In step S1003, the controller 0320 determines whether the degree of similarity calculated in step S1002 is equal to or greater than a predetermined value. If it is determined that the degree of similarity is equal to or greater than the predetermined value (YES in step S1003), the operation proceeds to step S1004. On the other hand, if it is determined that the degree of similarity is less than the predetermined value (NO in step S1003), the controller 0320 returns the operation to step S1001. In step S1001, the controller 0320 reads the next personal information from the personal information managed with the node.id which is not yet read and repeats the above-described processing in steps S1001 and S1002.

In step S1004, the controller 0320 identifies that the personal information (i.e., a record in the data table 0700) that is managed with the node.id currently referred to is the personal information of the captured human object. Then, the controller 0320 terminates the processing of the flowchart illustrated in FIG. 7.

<Content Generation Processing>

Figure 8B:
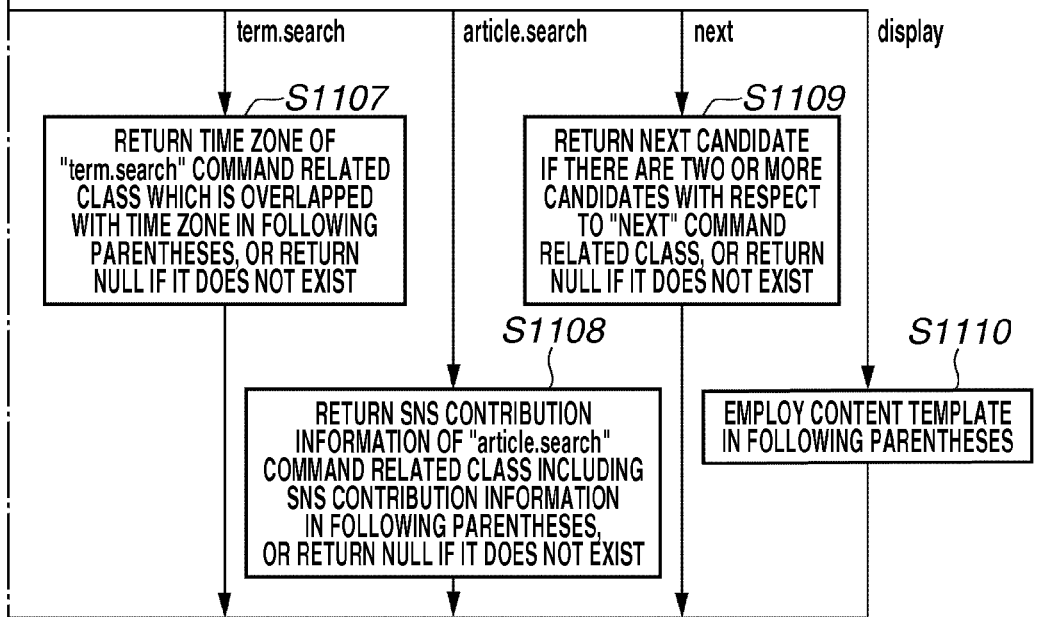
FIG. 8 (including FIGS. 8A and 8B) is a flowchart illustrating content generation processing performed by the processing server according to the first exemplary embodiment.

FIG. 8 (including FIGS. 8A and 8B) is a flowchart illustrating a procedure of the content generation processing performed by the processing server 0300 according to the present exemplary embodiment.

In step S1101, the controller 0320 of the processing server 0300 reads, for example, the content display script illustrated in FIG. 5 from the storage apparatus (e.g., the HDD 0310) and interprets the commands one by one. Then, the operation proceeds to step S1102.

In step S1102, the controller 0320 performs any one of eight types of branched processing (i.e., from step S1103 to step S1110) according to the interpreted command type.

b-1): If the command type interpreted by the controller 0320 is "if", then in step S1103, the controller 0320 determines true or false of the contents in parentheses that follows the "if" command. If it is true, the controller 0320 processes the subsequent processing block. If it is false, the controller 0320 skips the subsequent processing block. Then, the operation proceeds to step S1111.

b-2): If the command type interpreted by the controller 0320 is "todo.search", then in step S1104, the controller 0320 returns ToDo including text information in the following parentheses from among ToDo of the class to which the "todo.search" command belongs, or returns NULL if ToDo including text information in the following parentheses does not exist. Then, the operation proceeds to step S1111. The class to which the above-described command belongs indicates information written in front of "." (i.e., period) that precedes a command description, and the information becomes a processing target of the command. For example, the description "observer.todo.search( )" in the 150th row illustrated in FIG. 5 includes a "search" command that means performing "search" processing on "observer.todo" (ToDo of the observer) information.

b-3): If the command type interpreted by the controller 0320 is "meeting.search", then in step S1105, the controller 0320 returns, from among meetings of the class to which the "meeting.search" command belongs, a meeting which is identical in title, day, start time, and end_time attributes in the following parentheses, or returns NULL if it does not exist. Then, the operation proceeds to step S1111.

b-4): If the command type interpreted by the controller 0320 is "blank.search", then in step S1106, the controller 0320 searches for any time zone including no schedule in the class to which the "blank.search" command belongs, and returns a blank time zone that overlaps with the time zone in the following parentheses, or returns NULL if it does not exist. Then, the operation proceeds to step S1111.

b-5): If the command type interpreted by the controller 0320 is "term.search", then in step S1107, the controller 0320 returns, from among time zones of the class to which the "term.search" command belongs, a time zone which is overlapped with the time zone in the following parentheses, or returns NULL if it does not exist. Then, the operation proceeds to step S1111.

b-6): If the command type interpreted by the controller 0320 is "article.search", then in step S1108, the controller 0320 returns, from among SNS contributed information pieces of the class to which the "article.search" command belongs, information which includes SNS contributed information in the following parentheses, or returns NULL if it does not exist. Then, the operation proceeds to step S1111.

b-7): If the command type interpreted by the controller 0320 is "next", then in step S1109, the controller 0320 returns the next candidate if there is a plurality of candidates with respect to the class to which the "next" command belongs, or returns NULL if it does not exist. Then, the operation proceeds to step S1111.

b-8): If the command type interpreted by the controller 0320 is "display", then in step S1110, the controller 0320 employs a content template in parentheses following the "display" command. Then, the operation proceeds to step S1111.

If any one of the above-described eight, i.e., b-1) to b-8), types of processing is completed, then in step S1111, the controller 0320 determines whether the content template to be employed is determined. If the content template is determined (YES in step S1111), the operation proceeds to step S1112. If the content template is not determined (NO in step S1111), the operation returns to step S1101.

In step S1112, the controller 0320 reads the personal information identified by the face recognition processing illustrated in FIG. 7 (i.e., a record of the identified node.id) and generates content information by combining the personal information with a sentence in the content template according to a template format designation.

The above-described processing includes determination processing for determining a relationship between users with reference to personal information of the user who serves as the observer and personal information of the user who serves as the observation target person and processing for generating the content information for displaying the content based on the determined relationship on the display device 0201. More specifically, in this case, the controller 0320 functions as a unit configured to determine a relationship between users based on personal information pieces of the users and a unit configured to generate content information based on the determined relationship.

The content generation processing to be performed based on the content display script illustrated in FIG. 5 includes processing for determining whether the user who serves as the observer has personal acquaintance with the user who serves as the observation target person with reference to a command described in the row number 100.

If it is determined that the user who serves as the observer has personal acquaintance with the user who serves as the observation target person, the controller 0320 performs processing in subsequent row numbers 110 to 480. The processing in the row numbers 110 to 480 includes processing for determining a relationship between the observer and the observation target person and processing for generating content information based on the determined relationship.

On the other hand, if it is determined that the user who serves as the observer has no personal acquaintance with the user who serves as the observation target person, the controller 0320 performs processing in the row numbers 500 to 540. The processing in the row numbers 500 to 540 includes processing for generating content information which does not indicate a relationship between the observer and the observation target person (for example, content information indicating only who is the observation target person) without determining a relationship between the observer and the observation target person.

<Display of Content Information>

Figure 9A:
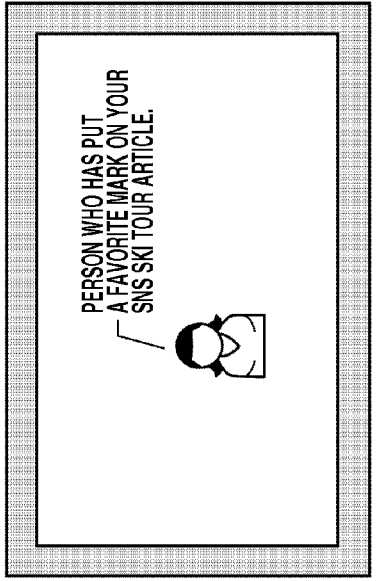
FIGS. 9A to 9C illustrate examples of the content display according to the first exemplary embodiment.
Figure 9C:
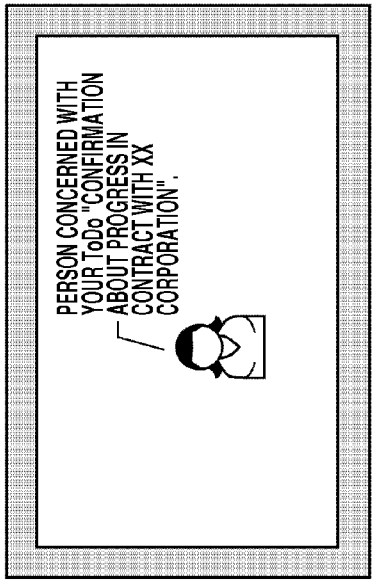
Figure 9B:
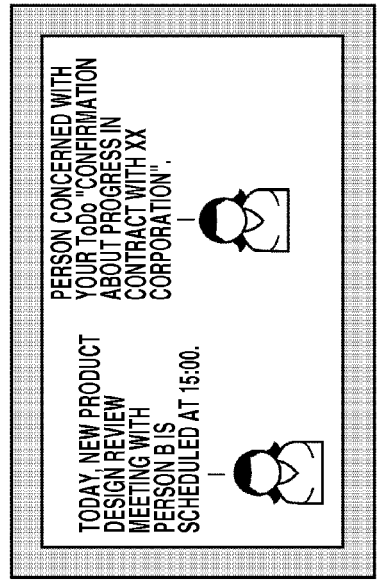

FIGS. 9A to 9C illustrate display examples of the content information according to the first exemplary embodiment.

FIG. 9A illustrates an example of content information generated in the processing illustrated in FIG. 8 which is displayed in association with an image of the user A on the display device 0201, when the user C takes a photograph of the user A with the camera 0203 of the tablet terminal 0200. The display content of the content information is determined based on the content of the data table 0700 of the personal information database illustrated in FIG. 4 and the content display script illustrated in FIG. 5 to be executed in the content generation processing.

The content information to be displayed is described in detail below according to the flow of the script illustrated in FIG. 5. First, the processing server 0300 refers to "observer.edge.target" in the 100th row, i.e., information of an observation target person (e.g., the user A) in the "edge" information of the observer (e.g., the user C), more specifically, the node.edge attribute of "node.id=0003" illustrated in FIG. 4, and obtains {node.id=1, 1}. The obtained {node.id=1, 1} indicates that the observer (e.g., the user C) has a relationship of "1" (acquaintance) with the node.id (the user A). Accordingly, in this case, the determination in the 100th row of the flow illustrated in FIG. 5 becomes "true" and the operation proceeds to a block starting with the 110th row. In the script, "//" indicates the presence of a comment, which has no influence on the processing.

Next, the processing server 0300 performs processing of if (result 1=observer.todo.search(target.name)) in the 150th row. The processing server 0300 determines whether the name of the user A, i.e., node.name of "node.id=0001" illustrated in FIG. 4, is included in ToDo of the user C, namely in the node.todo attribute of "node.id=0003" illustrated in FIG. 4, according to the processing in step S1104 illustrated in FIG. 8. As the ToDo of the user C includes the name of the user A, observer.todo is substituted into result1. As result1 is true in the "if" command determination, the operation proceeds to a block starting with the 160th row.

In the 170th and 180th rows, the processing server 0300 processes the display ("Person concerned with your ToDo \s", result1.title). The processing server 0300 employs the content template "Person concerned with your ToDo \s" according to the processing in step S1110 illustrated in FIG. 8. In this case, the content of result1.title is substituted to the portion of "\s". As the above-described result1 includes the substituted observer.todo, the result1.title means observer.todo.title, which is the title of ToDo of the user C, namely, title content "Confirmation about progress in contract with XX corporation" in the node.todo attribute of "node.id=0003" illustrated in FIG. 4.

The processing server 0300 skips each "else if" command in the 210th, 290th, and 430th rows illustrated in FIG. 5 when the determination result in the previous "if" command is true. Therefore, no processing is performed. Thus, in step S1112 illustrated in FIG. 8, the processing server 0300 generates the content—Person concerned with your ToDo "Confirmation about progress in contract with XX corporation"—. The tablet terminal 0200 of the user C displays the generated content in association with a video image of the user A, as illustrated in FIG. 9A.

FIG. 9B illustrates an example of content information generated in the content generation processing illustrated in FIG. 8 which is displayed in association with an image of the user A on the display device 0201, when the user D takes a photograph of the user A with the camera 0203 of the tablet terminal 0200. A processing flow to display the content information illustrated in FIG. 9B on the display device 0201 is similar to the flow of the above-described processing performed when the user C takes a photograph of the user A, and is not described in detail below. The tablet terminal 0200 of the user D displays content information "Person who has put a favorite mark on your SNS ski tour article" in association with the image of the user A.

As described above, content information that reflects a relationship between a user and other user can be obtained when the user takes a photograph of the other user. Therefore, the information processing system according to the present exemplary embodiment is useful in that a user can easily find a topic common to both of the user and the other user. Thus, the user can easily start a conversation with the other user.

According to the present exemplary embodiment, the observation target person is only one. However, the present invention is not limited to the above-described example. More specifically, in a case where an image captured by the camera 0203 includes a plurality of users (i.e., two or more observation target persons), the tablet terminal 0200 and the processing server 0300 perform the processing described in the above-described exemplary embodiments for each of the plurality of users included in the captured image.

More specifically, the tablet terminal 0200 and the processing server 0300 identify personal information of each observation target person based on face images of a plurality of observation target persons included in the captured image, and generate content information for each of the plurality of observation target persons based on the personal information of each identified observation target person and personal information of the user who serves as the observer. Then, the tablet terminal 0200 and the processing server 0300 calculate coordinates in the vicinity of position coordinates of the face images of respective observation target persons, for the generated plurality of pieces of content information. Further, the tablet terminal 0200 and the processing server 0300 displays the content information by superimposing at the calculated positions of the captured image.

For example, if the user C takes a photograph of the user A and the user B with the camera of the tablet terminal, content information illustrated in FIG. 9C can be displayed on the tablet terminal of the user C. More specifically, as illustrated in FIG. 9C, content information generated based on a relationship between the user A and the user C is displayed at a coordinate position adjacent to the face image of the user A (on the right side of FIG. 9C). Further, content information generated based on a relationship between the user B and the user C is displayed at a coordinate position adjacent to the face image of the user B (on the left side of FIG. 9C).

As described above, in a case where a captured image includes a plurality of users, the system according to the present exemplary embodiment can display content information corresponding to each user at a position adjacent to the user in a captured image. Therefore, even in a case where a plurality of pieces of content information is displayed, the content information can be displayed in association with a user who serves as an observation target person. Thus, the relationship between a plurality of pieces of content information and a plurality of users included in the captured image is clear and easy to understand.

System Configuration According to Second Exemplary Embodiment

FIG. 10 illustrates a configuration of an information processing system according to a second exemplary embodiment. The information processing system according to the present exemplary embodiment includes a head mounted display (HMD) 1500 mounted on each of two persons (i.e., a user C and a user D), a network camera 1700, a wireless access point 0400, a processing server 0300, and a network 9000. Each HMD 1500 is wirelessly connected to the wireless access point 0400. The processing server 0300 is connected to the wireless access point 0400 via the network 9000. The present exemplary embodiment is different from the first exemplary embodiment in that the user C and the user D are positioned on the backside of a user B and each of the user C and the user D cannot observe the face of the user B.

<HMD>

The HMD 1500 employed in the present exemplary embodiment is similar to the one obtainable in the market and can be mounted on the head of a user with a fixing frame. Further, the HMD 1500 is configured to include a transmissive display device 1501 at a position corresponding to one eye or both eyes, so that the user can simultaneously see an artificial image displayed on the display device and a real image observable through the display device 1501. Further, the HMD 1500 is equipped with a camera 1502 that can capture an image from a viewpoint adjacent to the user's eye.

Figure 11:
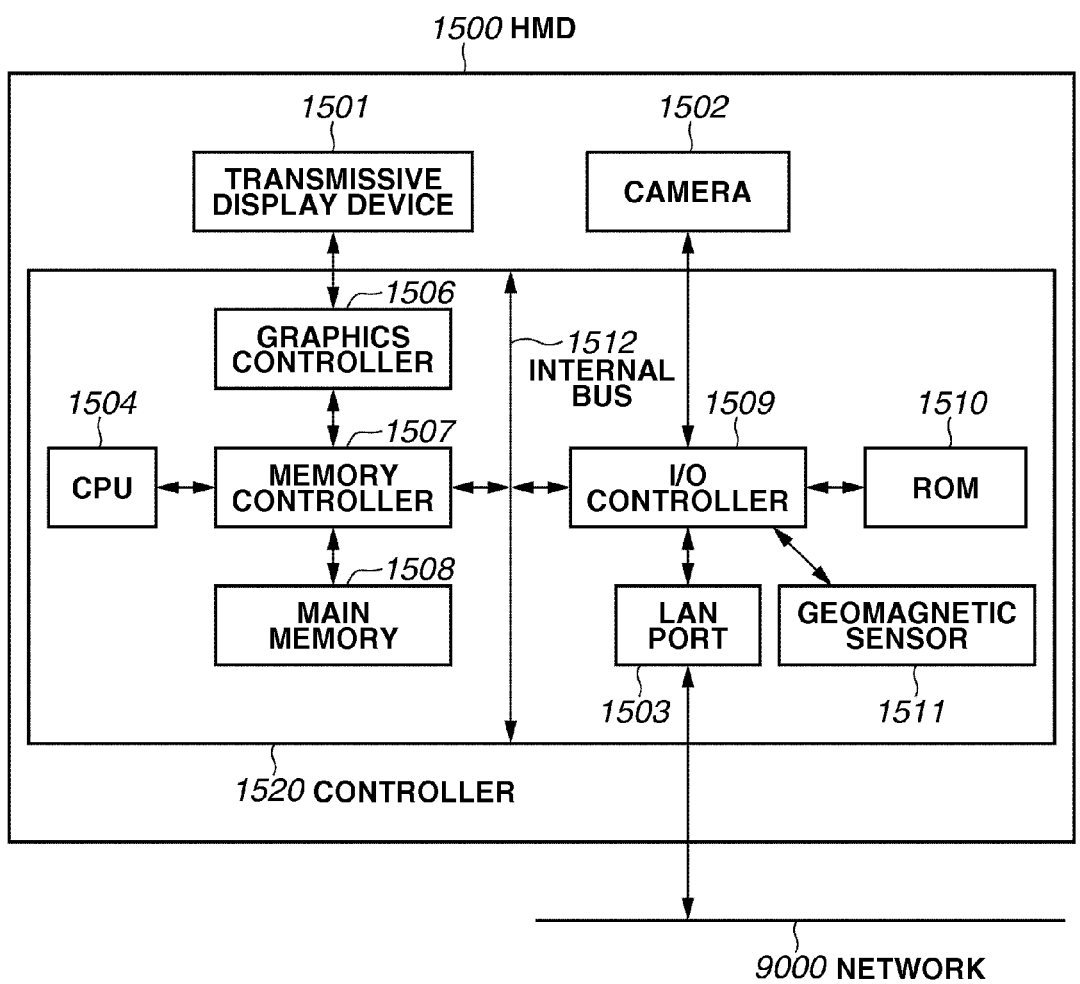
FIG. 11 is a block diagram illustrating a hardware configuration of a head mounted display (HMD) according to the second and third exemplary embodiments.

FIG. 11 is a hardware block diagram illustrating the HMD 1500 according to the present exemplary embodiment. The HMD 1500 includes a controller 1520, the transmissive display device 1501, and the camera 1502.

The controller 1520 has a hardware configuration described in detail below.

An internal bus 1512 transmits and receives electric signals to enable a memory controller 1507 to transmit and receive information to and from an I/O controller 1509. The memory controller 1507 comprehensively controls memory accesses to a main memory 1508. The I/O controller 1509 transmits and receives information to and from a read-only memory (ROM) 1510, a LAN port 1503, the transmissive display device 1501, a geomagnetic sensor 1511, and any processing unit connected via the internal bus 1512. The LAN port 1503 transmits and receives information to and from other device, such as the processing server 0300, connected via the access point 0400 and/or via the network 9000. Further, the LAN port 1503 transmits and receives information to and from the I/O controller 1509.

The ROM 1510 stores a boot loader program and an HMD control program. The main memory 1508 is a volatile memory which has high-speed access capability and stores information stored in the ROM 1510 and temporarily used information. When the power to the HMD 1500 is turned on, a CPU 1504 reads and executes the boot loader program and extracts the HMD control program stored in the ROM 1510. Further, the CPU 1504 stores the extracted HMD control program in the main memory 1508. Then, the CPU 1504 executes the HMD control program loaded from the main memory 1508 to realize each function of the HMD 1500. Further, the CPU 1504 executes the HMD control program to realize processing to be performed by the HMD 1500 illustrated in FIGS. 14 and 23.

The foregoing is the description relating to the configuration of the controller 1520.

The HMD 1500 includes the transmissive display device 1501 that can display information. A graphics controller 1506 controls the display on the transmissive display device 1501. When information is presented to a user, the HMD 1500 displays the information on the transmissive display device 1501. The HMD 1500 includes the camera 1502. The camera 1502 converts a captured image into digital image data. The camera 1502 transmits and receives information to and from the I/O controller 1509. The HMD 1500 includes the geomagnetic sensor 1511. The geomagnetic sensor 1511 can measure the direction, e.g., north, south, east, and west, and an inclination in the three-dimensional space of an object. Further, the geomagnetic sensor 1511 converts the measured information into digital information. The geomagnetic sensor 1511 transmits and receives information to and from the I/O controller 1509. Thus, the geomagnetic sensor 1511 enables the HMD 1500 to detect the face direction of a user who mounts the HMD 1500 in the physical space. A battery 1505 supplies electric power to the above-described units of the HMD 1500.

<Network Camera>

Figure 12:
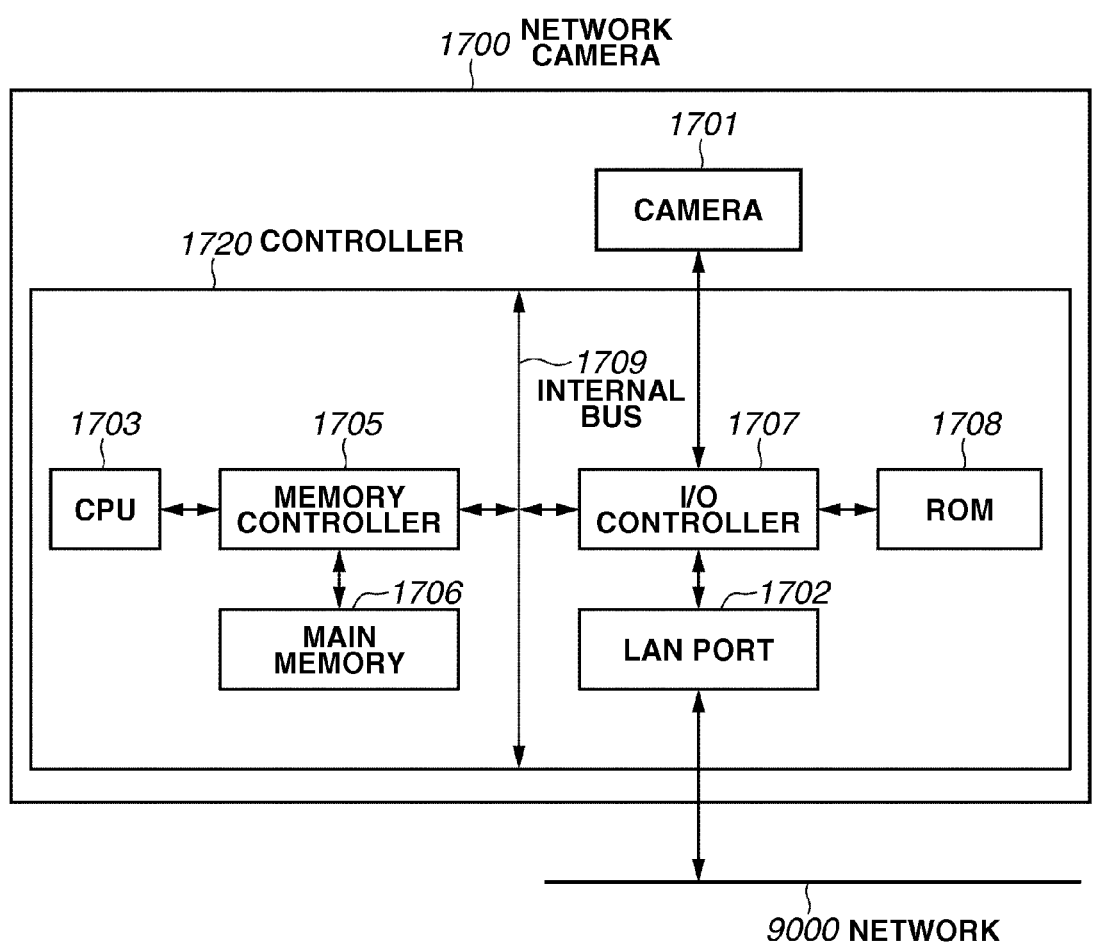
FIG. 12 is a block diagram illustrating a hardware configuration of a network camera according to the second and third exemplary embodiments.

The network camera 1700 used in the present exemplary embodiment is fixed on a ceiling so as to widely capture an image of a space in a building. In addition to the ceiling-mounted type, the network camera 1700 can be embedded in a wall or attached to a stand. FIG. 12 is a block diagram illustrating a hardware configuration of the network camera 1700 according to the present exemplary embodiment. The network camera 1700 includes a controller 1720 and a camera 1701. A configuration of the controller 1720 is described in detail below.

An internal bus 1709 transmits and receives electric signals to enable a memory controller 1705 to transmit and receive information to and from an I/O controller 1707. The memory controller 1705 comprehensively controls memory accesses to a main memory 1706. The I/O controller 1707 transmits and receives information to and from a ROM 1708, a LAN port 1702, the camera 1701, and any processing unit connected via the internal bus 1709.

The LAN port 1702 transmits and receives information to and from other device, such as the processing server 0300, connected via the access point 0400 and/or via the network 9000. Further, the LAN port 1702 transmits and receives information to and from the I/O controller 1707.

The ROM 1708 stores a boot loader program and a network camera control program. The main memory 1706 is a volatile memory which has high-speed access capability and stores information stored in the ROM 1708 and temporarily used information. When the power to the network camera 1700 is turned on, a CPU 1703 reads and executes the boot loader program and extracts the network camera control program stored in the ROM 1708. Further, the CPU 1703 stores the extracted network camera control program in the main memory 1706. Then, the CPU 1703 executes the network camera control program stored in the main memory 1706 to realize each function of the network camera 1700. Further, the CPU 1703 executes the network camera control program to realize processing to be performed by the network camera 1700 illustrated in FIG. 13.

The foregoing is the description relating to the configuration of the controller 1720.

The network camera 1700 includes the camera 1701. The camera 1701 converts a captured image into digital image data. The camera 1701 transmits and receives information to and from the I/O controller 1707.

Each of the processing server 0300, the wireless access point 0400, and the network 9000 has a configuration similar to that described in the first exemplary embodiment and the description thereof is not repeated.

Processing Flow According to Second Exemplary Embodiment

Figure 13:
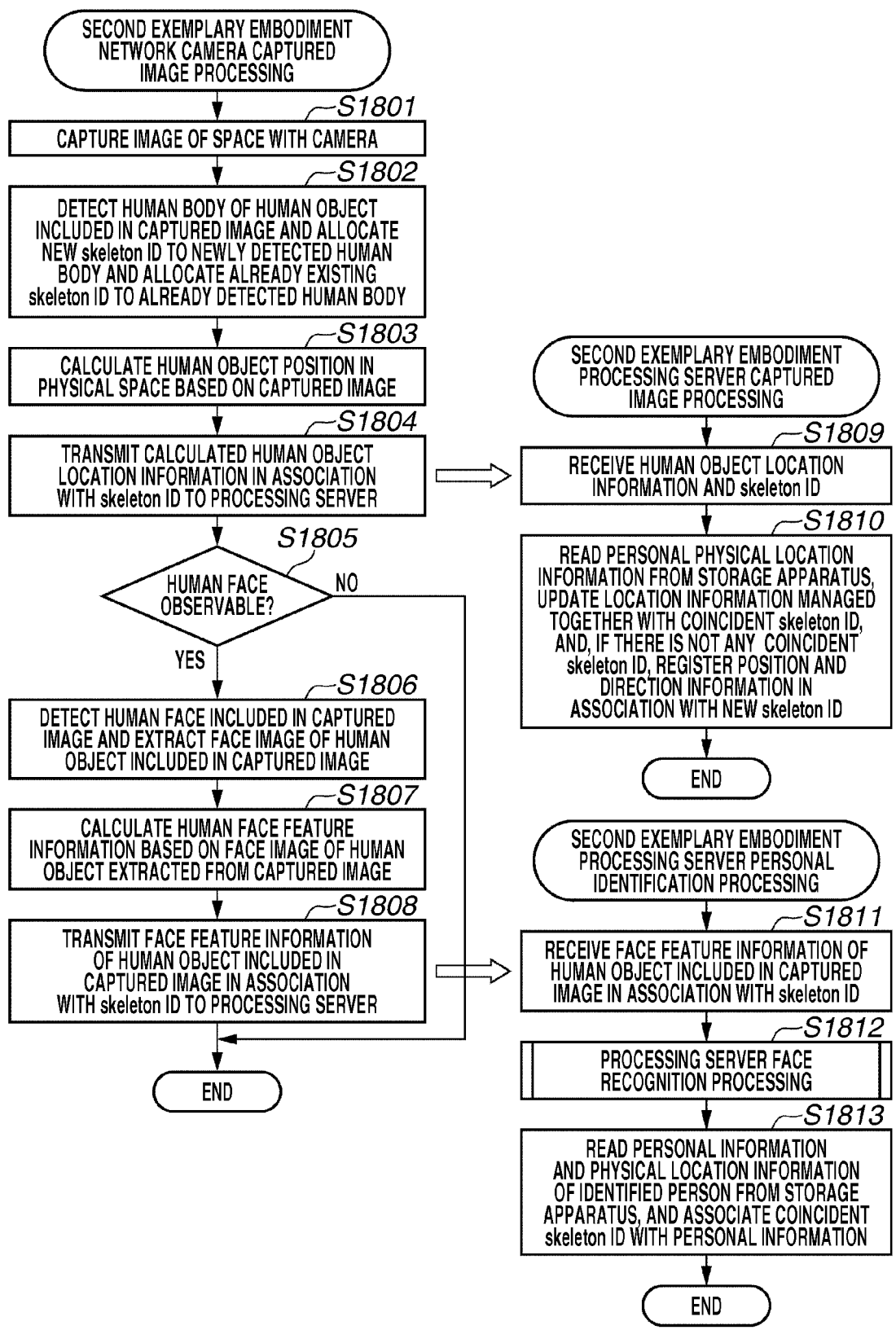
FIG. 13 is a flowchart illustrating captured image processing and personal identification processing according to the second and third exemplary embodiments.

FIG. 13 is a flowchart illustrating a procedure of captured image processing and a procedure of personal identification processing according to the second exemplary embodiment. The controller 1720 of the network camera 1700 performs captured image processing in steps S1801 to S1808.

In step S1801, the controller 1720 of the network camera 1700 controls the camera 1701 to capture an image of a space in a building (i.e., a physical space). Then, the operation proceeds to step S1802.

In step S1802, the controller 1720 detects a human body of a human object included in the captured image and newly allocates a skeleton ID to a newly detected human body. If the human body detected by the controller 1720 is an already detected human body, the controller 1720 allocates the already existing skeleton ID to the detected human body. Then, the operation proceeds to step S1803. There are various methods employable to detect a human body of a human object included in a captured image. According to the present exemplary embodiment, the controller 1720 employs a technique with use of a depth sensor that is capable of measuring a distance between the camera 1701 and a shooting object. However, the present exemplary embodiment is not limited to this method. The above-described skeleton ID is a unique number automatically allocated to each human body, to identify the human body detected by the controller 1720 in the following processing. The skeleton ID allocated to the detected human body is used in the following processing.

In step S1803, the controller 1720 calculates the position of the human object in the physical space based on the captured image. Then, the operation proceeds to step S1804. There are various methods employable to calculate the position of a human object in the physical space. According to the present exemplary embodiment, the controller 1720 employs a method for calculating the position of a measurement target based on depth information obtained from the above-described depth sensor and an angle formed between the normal line of an imaging plane of the depth sensor and the measurement target. However, any other position calculation method is employable because the employed method does not limit the scope of the present invention.

In step S1804, the controller 1720 transmits the calculated human object position information in association with the skeleton ID to the processing server 0300. Then, the operation proceeds to step S1805.

In step S1805, the controller 1720 determines whether a human face is observable. If it is determined that an observable human face is present (YES in step S1805), the operation proceeds to step S1806. If it is determined that there is not any observable human face (NO in step S1805), the controller 1720 terminates the processing of the network camera 1700. For example, a detection method using feature space vectors is usable, as described in the first exemplary embodiment, for determining whether a human face is observable. If it is detectable, the controller 1720 determines that a human face is observable.

In step S1806, the controller 1720 detects a human face included in the captured image and extracts a face image of the human object included in the captured image. Then, the operation proceeds to step S1807.

In step S1807, the controller 1720 calculates human face feature information based on the face image of the human object extracted from the captured image. Then, the operation proceeds to step S1808.

In step S1808, the controller 1720 transmits the above-described face feature information of the human object included in the captured image in association with the skeleton ID to the processing server 0300. Then, the controller 1720 terminates the processing of the network camera 1700.

The controller 0320 of the processing server 0300 performs captured image processing in steps S1809 and S1810.

In step S1809, the controller 0320 receives the human object position information and the skeleton ID from the network camera 1700. Then, the operation proceeds to step S1810.

In step S1810, the controller 0320 reads personal physical position information (i.e., an attribute in the "node.trace_info" column illustrated in FIG. 4) from each record of the data table 0700 stored in the HDD 0310. Then, the controller 0320 searches for a record that includes a skeleton ID that coincides with the skeleton ID received in step S1809. If a coincident skeleton ID is present, the controller 0320 updates the position information (i.e., "coord" information in the "node.trace_info" column) managed together with the coincident skeleton ID with the position information received in step S1809. Then, the controller 0320 terminates the captured image processing illustrated in FIG. 13. Further, if there is not any coincident skeleton ID (namely, if a new skeleton ID is received), the controller 0320 temporarily stores the skeleton ID and the position information received in step S1809 in the main memory 0308. The temporarily stored skeleton ID and the position information are associated with the personal information in processing in step S1813 which is described below. Then, the controller 0320 terminates the captured image processing illustrated in FIG. 13.

The controller 0320 of the processing server 0300 performs personal identification processing in steps S1811 to S1813.

In step S1811, the controller 0320 receives the face feature information of the human object included in the captured image and the skeleton ID from the network camera 1700. Then, the operation proceeds to step S1812.

In step S1812, the controller 0320 performs the face recognition processing illustrated in FIG. 7 to identify personal information of the human object included in the captured image (i.e., a record in the data table 0700). Then, the operation proceeds to step S1813.

In step S1813, the controller 0320 reads the physical position information (i.e., an attribute of the "node.trace_info" column illustrated in FIG. 4) of the personal information identified in step S1812 from the data table 0700 stored in the HDD 0310. Then, the controller 0320 determines whether a skeleton ID is allocated to the readout physical position information. If a skeleton ID is allocated to the readout physical position information, the controller 0320 terminates the processing of the flowchart illustrated in FIG. 13. On the other hand, if there is not any skeleton ID allocated to the readout physical position information, the controller 0320 newly allocates the skeleton ID received in step S1811 to the physical position information of the personal information identified in step S1812. In this case, the controller 0320 updates "coord" information of the physical position information including the newly allocated skeleton ID with the human object position information received in association with the skeleton ID in step S1809. Then, the controller 0320 terminates the personal identification processing of the processing server 0300.

According to the present exemplary embodiment, the processing server 0300 asynchronously performs the captured image processing and the personal identification processing due to the following reasons. In general, the face recognition processing is successfully done if the position and the direction of a target human object are appropriate for the camera to observe a face of the target human object. In other words, in some cases, the face may not be recognized. Therefore, it is important to grasp the position of a target human object, first. Further, it is important that human object position information can be linked with the personal information at the time when the target person has been identified based on the face recognition successfully completed. According to the present exemplary embodiment, four network cameras 1700 are positioned at separated spots to obtain various images of users from different directions as illustrated in FIG. 10. Accordingly, it is effective to improve the efficiency of the personal recognition processing because the number of conditions for determining the human face observability can be increased.

<Information Display Processing>

Figure 14:
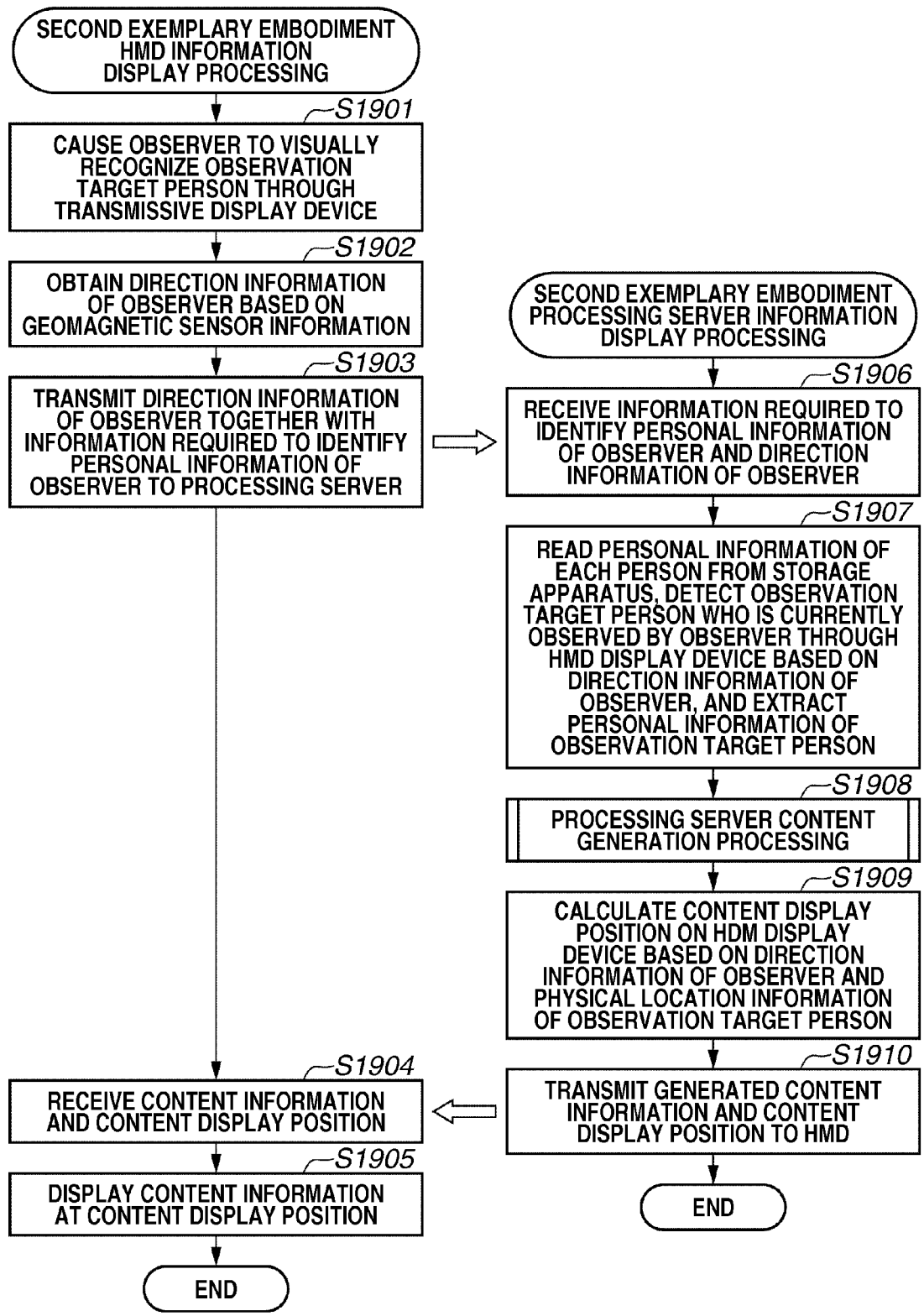
FIG. 14 is a flowchart illustrating information display processing according to the second exemplary embodiment.

FIG. 14 is a flowchart illustrating a procedure of information display processing according to the second exemplary embodiment. The controller 1520 of the HMD 1500 performs the information display processing in steps S1901 to S1905.

In step S1901, the controller 1520 causes a user who serves as the observer to visually recognize a user who serves as an observation target person through the transmissive display device 1501. Then, the operation proceeds to step S1902. The processing performed in step S1901 is not the processing to be performed by the controller 1520, but the action that the observer views the observation target person through the transmissive display device 1501.

In step S1902, the controller 1520 obtains the face direction of the observer based on geomagnetic sensor information obtained by the geomagnetic sensor 1511. Then, the operation proceeds to step S1903.

In step S1903, the controller 1520 transmits information required to identify personal information of the user who serves as the observer, which has been set beforehand in the main memory 1508, together with observer's line-of-sight information to the processing server 0300. Then, the operation proceeds to step S1904. According to the present exemplary embodiment, the information required to identify personal information is attribute ID in the "node.id" column of the data table 0700 illustrated in FIG. 4. The ID in the "node.id" column can be used to uniquely identify each user from other users. According to the above-described first exemplary embodiment, each user sets ID beforehand for the tablet terminal 0200. On the other hand, according to the present exemplary embodiment, the ID which is set by each user beforehand for the HMD 1500 is used. For example, an employee number of the user may be set as the ID beforehand for the tablet terminal 0200. The ID to be set is stored in the main memory 1508 of the controller 1520.

In step S1904, the controller 1520 receives content information and content display position from the processing server 0300. Then, the operation proceeds to step S1905.

In step S1905, the controller 1520 displays the received content information at the content display position on the transmissive display device 1501. Then, the controller 1520 terminates the information display processing illustrated in FIG. 14.

The controller 0320 of the processing server 0300 performs information display processing in steps S1906 to S1910.

In step S1906, the controller 0320 receives the information required to identify the personal information of the observer and the direction information which have been transmitted by the HMD 1500 in step S1903. Then, the operation proceeds to step S1907.

In step S1907, the controller 0320 reads a record (i.e., personal information) that includes the received information required to identify the personal information of the observer, from the data table 0700 stored in the HDD 0310. Then, the controller 0320 obtains physical position information (i.e., node.trace_info attribute information illustrated in FIG. 4) from the readout record. Then, the controller 0320 updates the "direction" information of the obtained physical position information with the direction information received in step S1906. Further, the controller 0320 obtains the observation target person who is currently observed by the user who serves as the observer through the transmissive display device 1501 of the HMD 1500, based on the updated physical position information. Subsequently, the controller 0320 extracts personal information of the observation target person from the data table 0700. Then, the operation proceeds to step S1908. A method for obtaining an observation target person is described in detail below with reference to FIG. 15.

In step S1908, the controller 0320 performs the content generation processing illustrated in FIG. 8 to generate content information. Then, the operation proceeds to step S1909.

In step S1909, the controller 0320 calculates a content display position on the transmissive display device 1501 of the HMD 1500, based on the direction information of the observer and the physical position information of the observation target person. Then, the operation proceeds to step S1910. A content display position calculation method is described in detail below with reference to FIG. 16.

In step S1910, the controller 0320 transmits the generated content information and the content display position to the HMD 1500, and then terminates the processing of the flowchart illustrated in FIG. 14.

<Obtainment of Observation Target Person>

Figure 15:
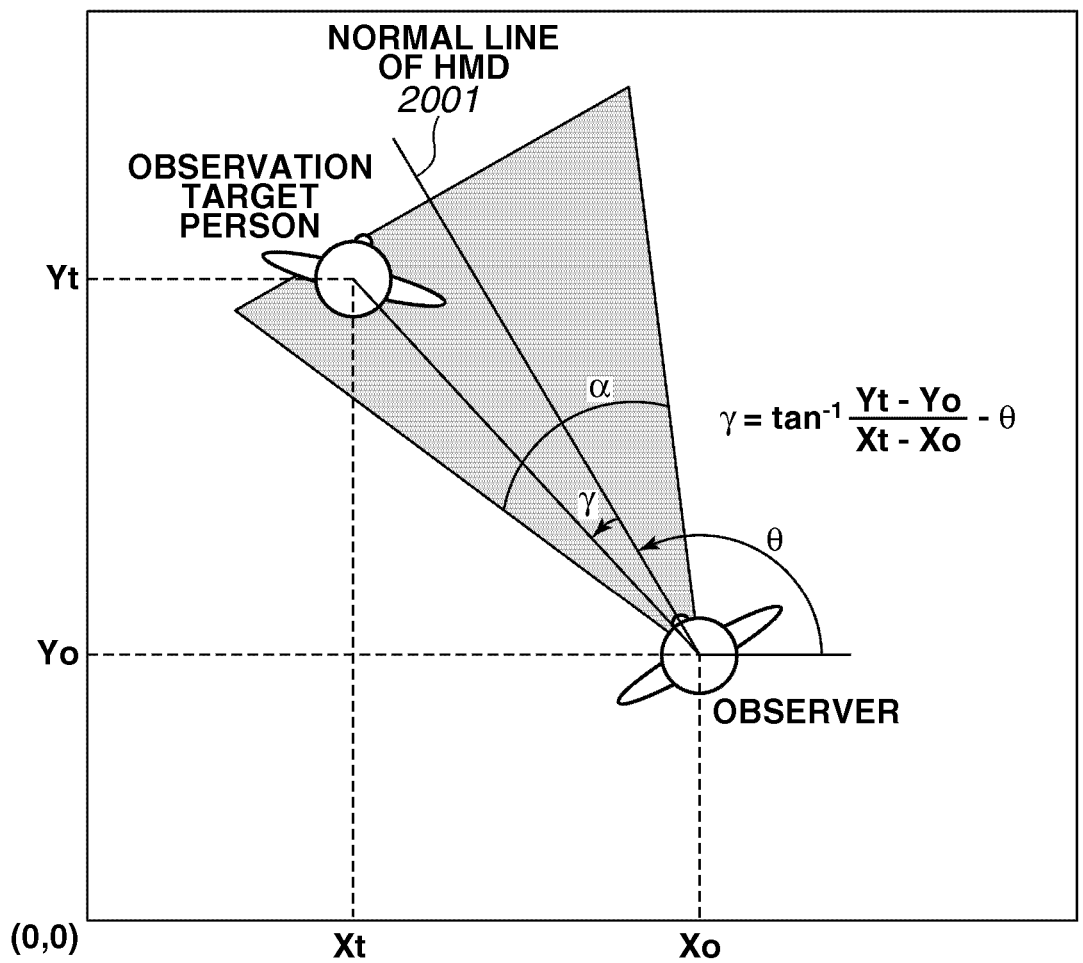
FIG. 15 schematically illustrates a method for obtaining an observation target person who is observed through the HMD of the observer in step S1907 illustrated in FIG. 14.

FIG. 15 schematically illustrates a method for obtaining an observation target person that can be observed by the observer through the transmissive display device 1501 of the HMD 1500, which is described in step S1907 illustrated in FIG. 14.

In this case, through the processing illustrated in FIG. 13, the controller 0320 of the processing server 0300 obtains physical position information pieces of all human objects detected by the network camera 1700 from the data table 0700. Further, the controller 0320 obtains the "direction" information (i.e., observer's direction information) of the physical position information which has been updated in step S1907 illustrated in FIG. 14.

The controller 0320 internally generates a map as illustrated in FIG. 15 based on the obtained physical position information of each human object and the observer's direction information. The map illustrated in FIG. 15 is an overhead view indicating a positional relationship between the observer and other human object. More specifically, the controller 0320 obtains position coordinates (Xo, Yo) of the user who serves as the observer and position coordinates (Xt, Yt) of the user who serves as other human object in the space of a building (i.e., in the physical space) based on the "coord" information of the physical position information of the users. Further, the controller 0320 obtains a direction θ (hereinafter, referred to as a normal line 2001 of the HMD 1500) of the user who serves as the observer from the "direction" information. According to the present exemplary embodiment, the direction θ is expressed in terms of radians and the "direction" information is expressed in terms of degrees. Therefore, the direction θ and the "direction" information are mutually convertible.

Next, the controller 0320 obtains an angle γ illustrated in FIG. 15. The angle γ represents an angle formed between the direction of the other human object (i.e., the observation target person) and the normal line 2001 of the HMD 1500 mounted on the observer. The angle γ is obtained using the following formula.

$$\gamma = \tan^{-1}\frac{Yt - Yo}{Xt - Xo} - \theta \qquad \text{[Formula 1]}$$

Then, the controller 0320 determines whether the other human object (i.e., the observation target person) is the observation target person based on a comparison between a viewing angle α covered by the transmissive display device 1501 of the HMD 1500 and the angle γ. According to the present exemplary embodiment, the observation target person is a human object that can be observed through the transmissive display device 1501 of the HMD 1500 mounted on the observer. If the relationship |γ|<α/2 is satisfied, the controller 0320 determines that the other human object is the observation target person. If the relationship |γ|<α/2 is not satisfied, the controller 0320 determines that the other human object is not the observation target person.

<Calculation of Content Information Display Position>

Figure 16:
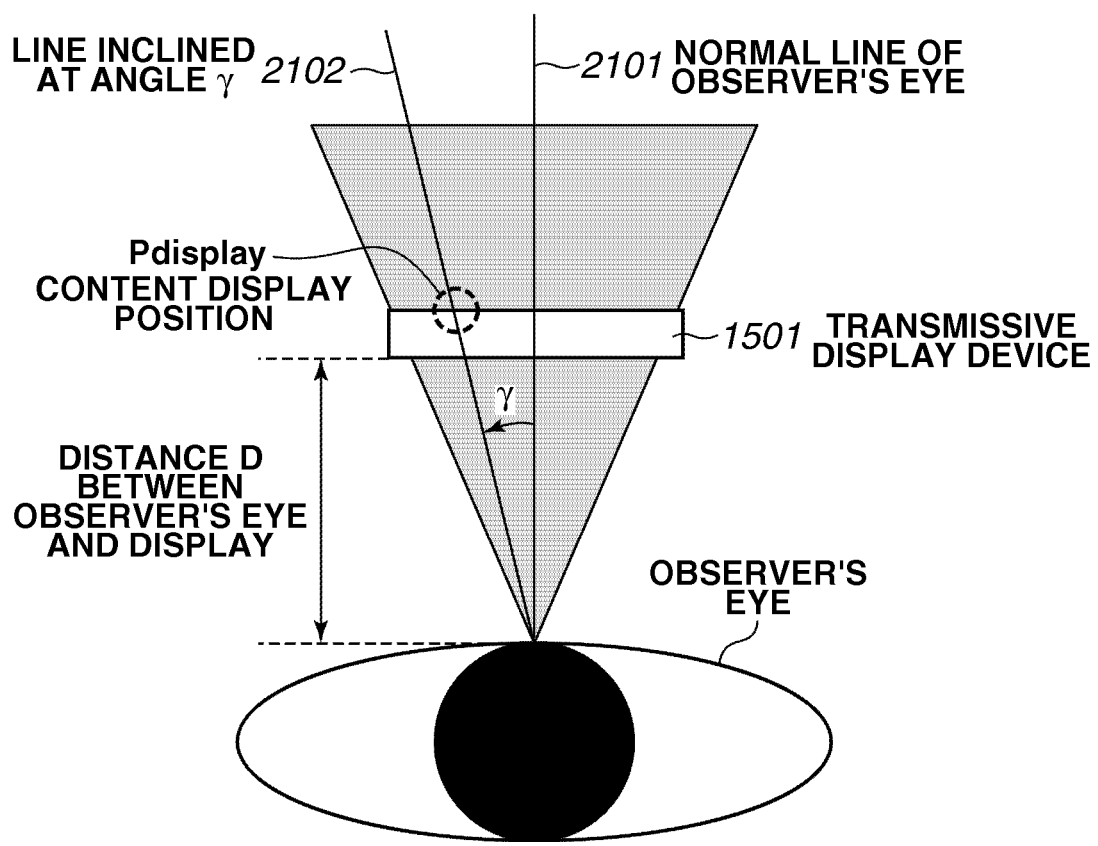
FIG. 16 schematically illustrates a method for calculating a content display position on a display device of the HMD by the processing server in step S1909 illustrated in FIG. 14.

FIG. 16 schematically illustrates a method according to which the controller 0320 of the processing server 0300 calculates a content information display position on the transmissive display device 1501 of the HMD 1500 in step S1909 illustrated in FIG. 14.

In FIG. 16, a normal line 2101 of an observer's eye is identical to the normal line 2001 of the HMD 1500. A line 2102 represents the direction of the other human object (i.e., the observation target person), which is inclined at the angle γ relative to the normal line 2001 of the HMD 1500 and calculated in FIG. 15. An intersection point of the line 2102 and the display device 1501 of the HMD 1500 is a content display position "Pdisplay". The observation target person seen from the observer can be visually recognized at the position "Pdisplay" on the transmissive display device 1501 of the HMD 1500. Content information is displayed at the content display position "Pdisplay" on the transmissive display device 1501.

The controller 0320 calculates the content display position "Pdisplay" based on the following formula.

$$P_{display} = D \cdot \tan \gamma \qquad [\text{Formula 2}]$$

In the formula 2, D represents a distance between the observer's eye and the transmissive display device 1501 which is a value determined beforehand.

Content Information Display According to Second Exemplary Embodiment

Figure 17A:
FIGS. 17A and 17B illustrate examples of the content display according to the second exemplary embodiment.
Figure 17B:

FIGS. 17A and 17B illustrate display examples of the content information according to the second exemplary embodiment.

FIG. 17A illustrates an example of content information displayed in association with a real image of the user B on the transmissive display device 1501, when the user C views the user B through the HMD 1500. As described in the first exemplary embodiment, the display content of the content information is determined based on the content of the data table 0700 of the personal information database illustrated in FIG. 4 and the content display script illustrated in FIG. 5. The content generation processing is performed according to a procedure similar to that described in the first exemplary embodiment, thus detail description thereof is not repeated.

The HMD 1500 of the user C displays a content "Today, new product design review meeting with user B is scheduled at 15:00" in association with the real image of the user B. FIG. 17B illustrates content information displayed in association with a real image of the user B on the transmissive display device 1501, when the user D views the user B via the HMD 1500. The content generation processing is performed according to a procedure similar to that described in the first exemplary embodiment, thus detail description thereof is not repeated. The HMD 1500 of the user D displays the content information "Today, you have a chance to talk directly to user B from now to 15:00" in association with a real image of the user B.

As described above, even in a case where an observer see a person in the real world but cannot visually recognize a face of him/her or cannot distinguish who he/she is because the person is in a hiding place or the like, the above-described content information display enables the observer to confirm the presence of the observation target and obtain a topic common to both of the observer and the observation target. Therefore, it is easy to start a conversation between the observer and the observation target.

According to the present exemplary embodiment, the observation target person is only one user. However, the present invention is not limited to the above-described example. More specifically, in a case where the observer can see a plurality of users through the transmissive display device 1501, the HMD 1500 and the processing server 0300 identify a plurality of observation target persons observed by the observer and perform the processing described in the above-described exemplary embodiments for each observation target person. Then, content information generated for each observation target person can be displayed, at a position adjacent to a real image of each observation target person seen through the transmissive display device 1501, on the transmissive display device 1501. For example, content information can be displayed at positions adjacent to respective real images of a plurality of observation target persons as illustrated in FIG. 9C, although the display may be slightly different between the transmissive display device 1501 and the tablet terminal 0200.

A configuration according to a third exemplary embodiment is similar to the configuration described in the second exemplary embodiment unless it is specially mentioned. The third exemplary embodiment is different from the second exemplary embodiment in that the HMD 1500 displays an icon that represents the position of a human object in the physical space on the transmissive display device 1501, to enable an observer to comprehensively grasp a positional relationship between two or more human objects, including the observer.

Information Display Processing According to Third Exemplary Embodiment

FIG. 18 is a flowchart illustrating a procedure of information display processing according to the third exemplary embodiment.

The controller 1520 of the HMD 1500 performs information display processing in steps S2301 to S2303.

In step S2301, the controller 1520 transmits information required to identify personal information of the observer to the processing server 0300. Then, the operation proceeds to step S2302.

In step S2302, the controller 1520 receives content information of each observation target person and physical position information of the observer and the observation target person. Then, the operation proceeds to step S2303.

In step S2303, the controller 1520 performs mapping of icons representing the observer and the observation target person on a two-dimensional plane, based on the physical position information of the observer and the observation target person. Then, the controller 0320 displays an icon image after mapping on the transmissive display device 1501, and terminates the information display processing illustrated in FIG. 18.

The controller 0320 of the processing server 0300 performs information display processing in steps S2304 to S2307.

In step S2304, the controller 0320 receives the information required to identify the personal information of the observer. Then, the operation proceeds to step S2305.

In step S2305, the controller 0320 identifies personal information of each person based on the information received from the data table 0700 stored in the HDD 0310 in step S2304, and reads physical position information based on the identified personal information. Then, the controller 0320 obtains an observation target person who is positioned closely to the observer, and extracts personal information of the detected observation target person. Then, the operation proceeds to step S2306. To obtain the observation target person who is positioned closely to the observer, the controller 0320 reads the "coord" information in the physical position information of the observer and each of other human objects. Then, the controller 0320 determines whether the distance between the position coordinates indicated by the "coord" information of the observer and position coordinates indicated by the "coord" information of each human object is less than a predetermined distance. The controller 0320 determines a human object, if the distance from the observer is less than the predetermined distance, as an observation target person.

In step S2306, the controller 0320 performs the content generation processing illustrated in FIG. 8. Then, the operation proceeds to step S2307.

In step S2307, the controller 0320 transmits content information of each observation target person generated in step S2306 and physical position information of the observer and the observation target person to the tablet terminal 0200, and terminates the information display processing of the processing server 0300.

Content Information Display According to Third Exemplary Embodiment

Figure 19:
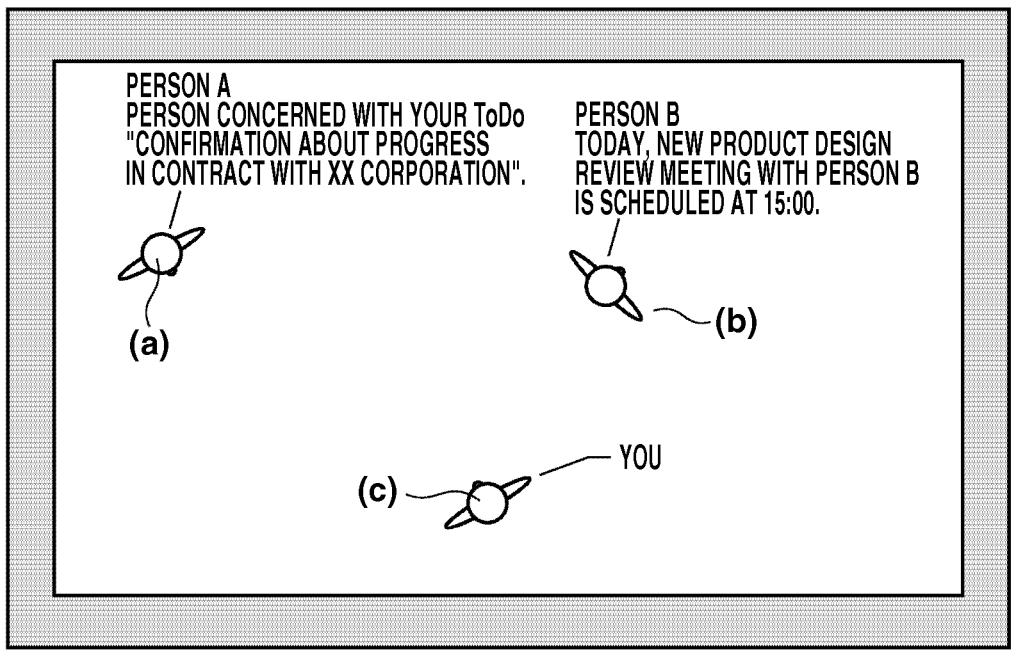
FIG. 19 illustrates an example of the content display according to the third exemplary embodiment.

FIG. 19 illustrates a display example of the content information according to the third exemplary embodiment. The example view illustrated in FIG. 19 includes content information and three persons, i.e., the user A, the user B, and the user C, positioned closely, which are displayed on the transmissive display device 1501 of the HMD 1500 of the user C.

In FIG. 19, a symbol (a) represents the user A displayed in association with content information. In FIG. 19, a symbol (b) represents the user B displayed in association with content information. Further, in FIG. 19, a symbol (c) represents the observer (i.e., the user C). As described in the first exemplary embodiment, the display content of the content information is determined based on the content of the data table 0700 of the personal information database illustrated in FIG. 4 and the content display script illustrated in FIG. 5. The content generation processing can be performed according to a procedure similar to that described in the second exemplary embodiment.

As described above, the third exemplary embodiment is different from the first and second exemplary embodiments in that the observer can comprehensively obtain information of each person before starting a conversation with a target person who is involved in an observer's work. Thus, the observer can easily grasp the position of the target person and can smoothly reach there.

An example operation according to a fourth exemplary embodiment enables a user to set the content display script illustrated in FIG. 5.

<Display of Content Display Script Setting Screen>

Figure 20:
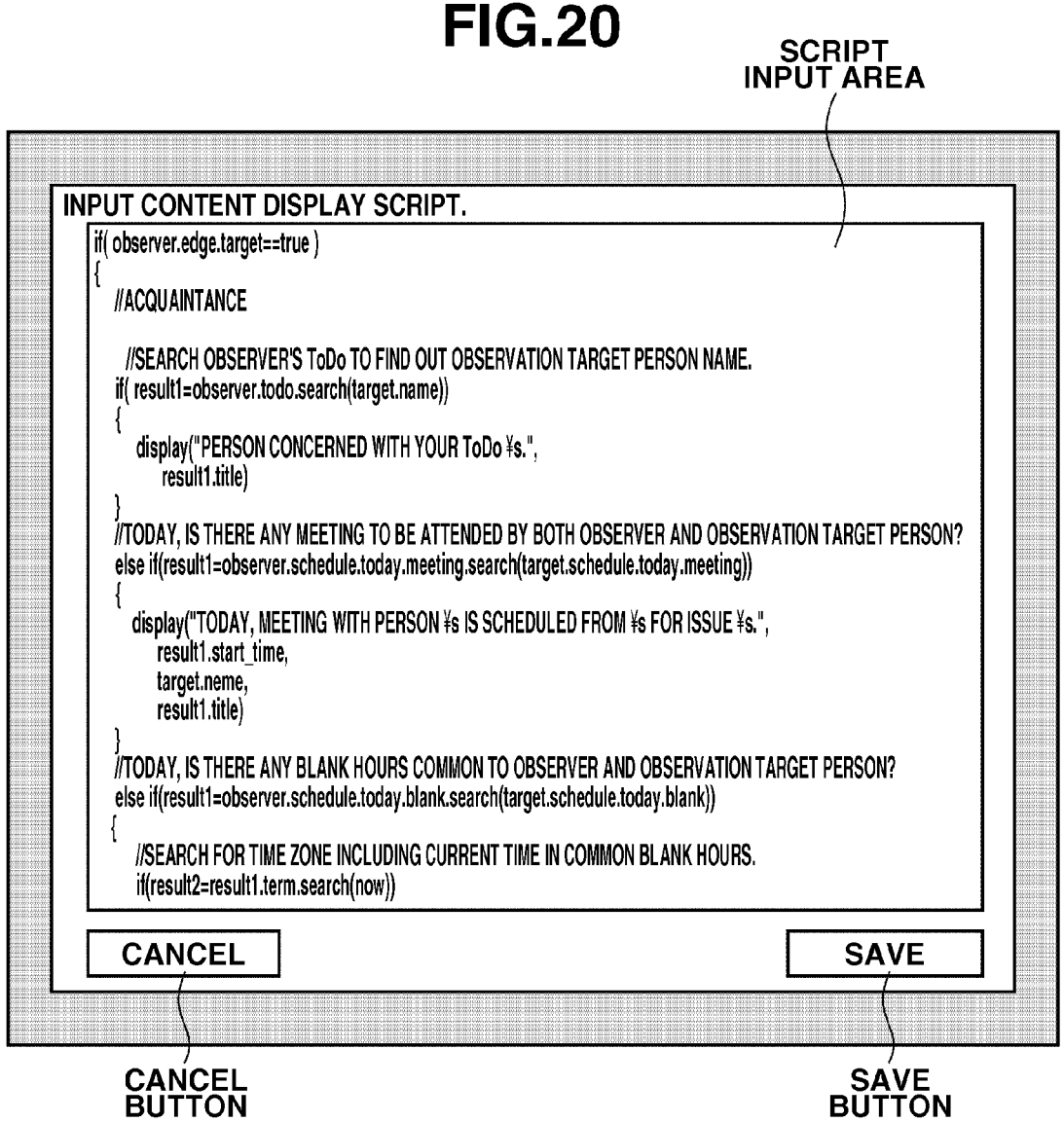
FIG. 20 illustrates an example screen provided by the processing server to enable a user to set a content display script according to a fourth exemplary embodiment.

FIG. 20 illustrates an example of a screen that is provided by the controller 0320 of the processing server 0300 to enable a user to set a content display script to be used in the content generation processing according to the fourth exemplary embodiment. The screen illustrated in FIG. 20 includes a script input area, a save button, and a cancel button. Each user can input a script via the keyboard 0302 and can press the save button and the cancel button with the mouse 0303. More specifically, the user can set a content display script by describing a new script, or editing the existing script, and saving the edited script, in the script input area of the screen, and storing the script.

<Content Display Script Setting Processing>

Figure 21:
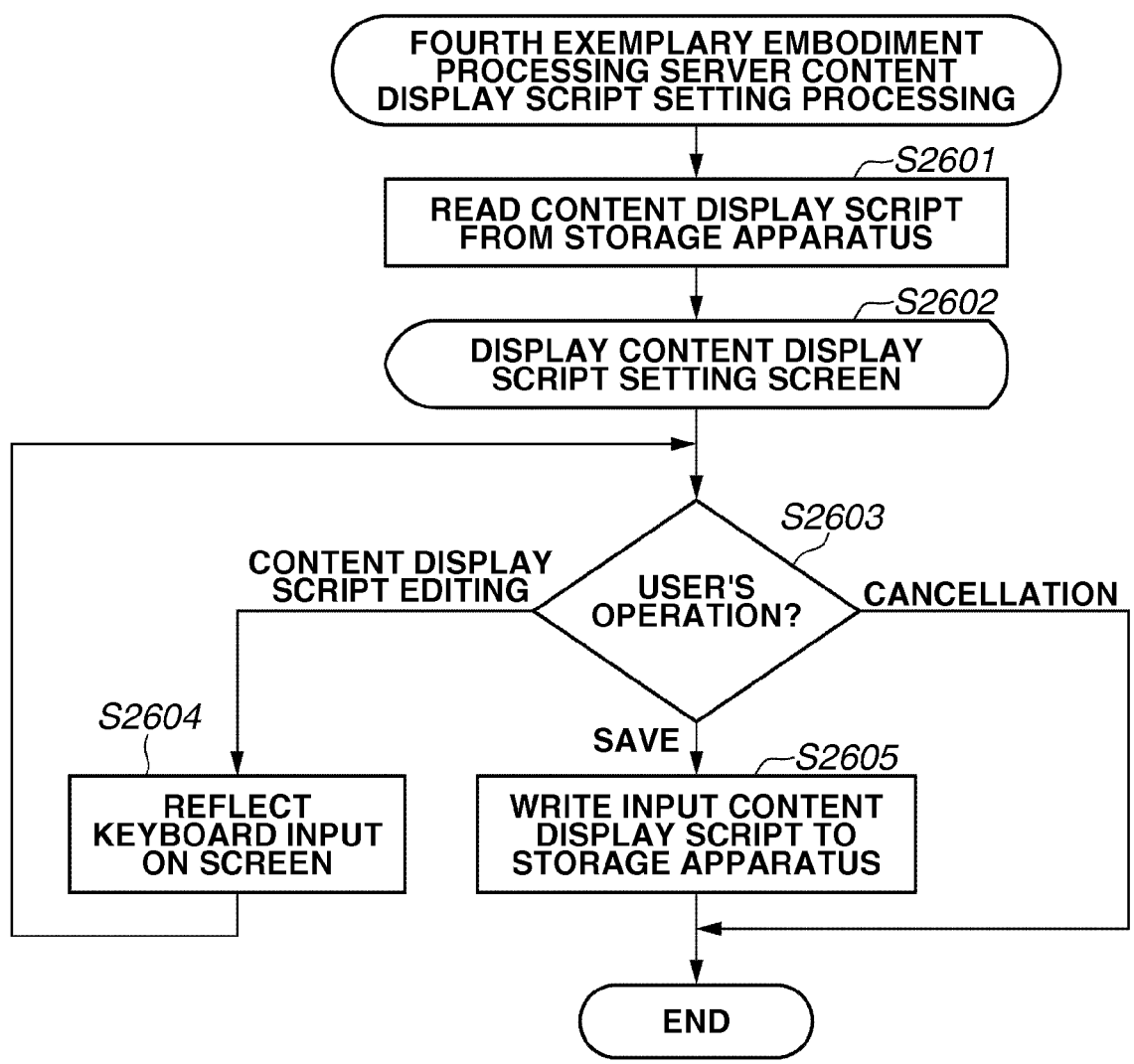
FIG. 21 is a flowchart illustrating content display script setting processing performed by the processing server according to the fourth exemplary embodiment.

FIG. 21 is a flowchart illustrating a procedure of the content display script setting processing performed by the controller 0320 of the processing server 0300 according to the fourth exemplary embodiment.

In step S2601, the controller 0320 reads a content display script from the HDD 0310. Then, the operation proceeds to step S2602.

In step S2602, the controller 0320 displays a content display script setting screen which includes a message that prompts a user to input a content display script, the script input area, the save button, and the cancel button, on the display device 0301. Then, the operation proceeds to step S2603.

In step S2603, the controller 0320 identifies an operation input by the user.

If it is determined that the operation input by the user is editing the content display script, then in step S2604, the controller 0320 reflects the content input via the keyboard 0302 on the screen. Then, the operation returns to step S2603.

If it is determined that the operation input by the user is save, then in step S2605, the controller 0320 writes the input content display script in the HDD 0310 and terminates the processing of the flowchart illustrated in FIG. 21.

If it is determined that the operation input by the user is cancellation, the controller 0320 terminates the processing of the flowchart illustrated in FIG. 21 without performing any processing.

The system according to the fourth exemplary embodiment allows a user to input a script. Alternatively, it is useful to display a plurality of options with respect to the behavior of the system on the display device to enable a user to select a desired option.

As described above, the system according to the present exemplary embodiment enables a user to freely edit a content display script illustrated in FIG. 5. Therefore, a user can freely customize the content information generated through the content generation processing. The content information can be displayed on the display device in such a way as to reflect user's intent.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-055002 filed Mar. 12, 2012, which is hereby incorporated by reference herein in its entirety.

What is claimed is:

1. An information processing system, comprising:
   a display unit configured to display an image of an observation target person observed by an observer in a display area;
   a storage unit configured to store personal information of the observer and personal information of the observation target person;
   a determination unit configured to determine a relationship between the observer and the observation target person based on the personal information of the observer and the personal information of the observation target person stored in the storage unit; and a generation unit configured to generate content information to be displayed in the display area based on the relationship determined by the determination unit, wherein the generated content information is displayed together with the image of the observation target person in the display area, and the personal information of the observer and the personal information of the observation target person stored in the storage unit include at least acquaintance information indicating whether the observer has personal acquaintance with the observation target person, if the acquaintance information included in the personal information of the observer and the personal information of the observation target person stored in the storage unit indicates that the observer has personal acquaintance with the observation target person, the determination unit determines the relationship between the observer and the observation target person and the generation unit generates the content information based on the determined relationship, and if the acquaintance information included in the personal information of the observer and the personal information of the observation target person stored in the storage unit indicates that the observer does not have any personal acquaintance with the observation target person, the determination unit does not determine the relationship between the observer and the observation target person and the generation unit generates content information that does not indicate any relationship between the observer and the observation target person.

2. A method for controlling an information processing system that includes a storage unit configured to store personal information of an observer and personal information of an observation target person, the method comprising:

displaying an image of the observation target person observed by the observer on a display area;

determining a relationship between the observer and the observation target person based on the personal information of the observer and the personal information of the observation target person stored in the storage unit; and generating content information to be displayed in the display area based on the determined relationship, wherein the generated content information is displayed together with the image of the observer on the display area, and the stored personal information of the observer and the stored personal information of the observation target person include at least acquaintance information indicating whether the observer has personal acquaintance with the observation target person, if the acquaintance information included in the stored personal information of the observer and the stored personal information of the observation target person indicates that the observer has personal acquaintance with the observation target person, determining the relationship between the observer and the observation target person and generating the content information based on the determined relationship, and if the acquaintance information included in the stored personal information of the observer and the stored personal information of the observation target person indicates that the observer does not have any personal acquaintance with the observation target person, generating content information that does not indicate any relationship between the observer and the observation target person.

3. A non-transitory computer readable storage medium storing a program causing at least one computer to execute an information processing method utilizing a storage device that stores personal information of an observer and personal information of an observation target person, the method comprising:

displaying an image of the observation target person observed by the observer on a display area;

determining a relationship between the observer and the observation target person based on the personal information of the observer and the personal information of the observation target person stored in the storage device; and generating content information to be displayed in the display area based on the determined relationship, wherein the generated content information is displayed together with the image of the observer in the display area, and the stored personal information of the observer and the stored personal information of the observation target person include at least acquaintance information indicating whether the observer has personal acquaintance with the observation target person, if the acquaintance information included in the stored personal information of the observer and the stored personal information of the observation target person indicates that the observer has personal acquaintance with the observation target person, determining the relationship between the observer and the observation target person and generating the content information based on the determined relationship, and if the acquaintance information included in the stored personal information of the observer and the stored personal information of the observation target person indicates that the observer does not have any personal acquaintance with the observation target person, generating content information that does not indicate any relationship between the observer and the observation target person.

* * * * *